US011956238B2

(12) United States Patent
Omori et al.

(10) Patent No.: US 11,956,238 B2
(45) Date of Patent: Apr. 9, 2024

(54) AUTHORIZATION SYSTEM AND AUTHORIZATION METHOD

(71) Applicant: Nippon Telegraph and Telephone Corporation, Tokyo (JP)

(72) Inventors: Yoshihiko Omori, Tokyo (JP); Takao Yamashita, Tokyo (JP); Hideo Nishimura, Tokyo (JP)

(73) Assignee: Nippon Telegraph and Telephone Corporation, Tokyo (JP)

(*) Notice: Subject to any disclaimer, the term of this patent is extended or adjusted under 35 U.S.C. 154(b) by 551 days.

(21) Appl. No.: 17/270,205

(22) PCT Filed: Aug. 23, 2019

(86) PCT No.: PCT/JP2019/033191
§ 371 (c)(1),
(2) Date: Feb. 22, 2021

(87) PCT Pub. No.: WO2020/040313
PCT Pub. Date: Feb. 27, 2020

(65) Prior Publication Data
US 2021/0320924 A1 Oct. 14, 2021

(30) Foreign Application Priority Data

Aug. 24, 2018 (JP) ................................ 2018-157829

(51) Int. Cl.
*H04L 9/40* (2022.01)
*E05B 49/00* (2006.01)
(52) U.S. Cl.
CPC ............ *H04L 63/101* (2013.01); *E05B 49/00* (2013.01); *H04L 63/0823* (2013.01); *H04L 63/105* (2013.01)

(58) Field of Classification Search
CPC . H04L 63/101; H04L 63/0823; H04L 63/105; H04L 63/10; H04L 63/126;
(Continued)

(56) References Cited

U.S. PATENT DOCUMENTS 10,121,301 B1* 11/2018 Ren .................... G07C 9/00896
2006/0072755 A1* 4/2006 Oskari ............... G07C 9/00309
380/270

(Continued)

OTHER PUBLICATIONS

Abdallah Kassem et al., "A Smart Lock System using Wi-Fi Security", 2016, pp. 222-225 (Year: 2016).*

(Continued)

*Primary Examiner* — Luu T Pham
*Assistant Examiner* — Canh Le
(74) *Attorney, Agent, or Firm* — Fish & Richardson P.C.

(57) ABSTRACT

[Problem] Provided is an authorization system capable of reducing a load on a host regarding an invitation procedure in a case where there is a large number of guests or guests are frequently invited, and preventing identity theft or invitation of an unwanted third party.
[Solution] In an authorization system 1X, a representative guest terminal 10A acquires information about non-representative guest terminals 10B and 10C from the non-representative guest terminal 10B and 10C, a host terminal 10H acquires and verifies signed information about the terminals 10A, 10B, and 10C from the representative guest terminal 10A, and a management server 20 acquires and verifies the information about the host terminal 10H and the signed information about the terminals 10A, 10B, and 10C from the host terminal 10H, performs authentication based on information about the host terminal 10H registered in advance, registers the information about the terminals 10A, 10B, and 10C, when the authentication is successful, acquires and performs authentication on information about the terminals (Continued)

10A, 10B, and 10C from a smart lock 30, and unlocks the smart lock 30 based on a result of the authentication.

5 Claims, 17 Drawing Sheets

(58) Field of Classification Search
CPC ......... H04L 9/32; H04L 9/006; H04L 9/3263; H04L 63/08; H04L 63/12; E05B 49/00; G06F 21/31; G06F 21/64; G06F 21/6209; G06F 21/62; G06F 21/33; G09C 1/00
See application file for complete search history.

(56) References Cited

U.S. PATENT DOCUMENTS

| | | | | |
|---|---|---|---|---|
| 2011/0047373 A1* | 2/2011 | Karasawa | ............. | H04L 9/3268 713/155 |
| 2013/0204982 A1* | 8/2013 | Kim | ........................ | H04W 4/60 709/219 |
| 2013/0342314 A1* | 12/2013 | Chen | .................. | G07C 9/00309 340/5.65 |
| 2018/0165633 A1* | 6/2018 | Chen | ................... | G07C 9/00912 |
| 2019/0362574 A1* | 11/2019 | Tang | .................. | G07C 9/00182 |
| 2022/0101399 A1* | 3/2022 | Eidam | ................ | G06Q 30/0613 |

OTHER PUBLICATIONS

Krishna Prasad et al., Authentic Gate Entry System (AuthGES) by Using LBPH for Smart Home Security, 2018, pp. 191-196 (Year: 2018).*

Qrio.Me, [online], "Qrio Smart Lock," 2021, retrieved on Aug. 10, 2018, retrieved from URL<https://grio.me/smartlock>, 14 pages.

* cited by examiner

AUTHORIZATION SYSTEM AND AUTHORIZATION METHOD

CROSS-REFERENCE TO RELATED APPLICATIONS

This application is a National Stage application under 35 U.S.C. § 371 of International Application No. PCT/JP2019/033191, having an International Filing Date of Aug. 23, 2019, which claims priority to Japanese Application Serial No. 2018-157829, filed on Aug. 24, 2018. The disclosure of the prior application is considered part of the disclosure of this application, and is incorporated in its entirety into this application.

TECHNICAL FIELD

The present invention relates to an authorization system and an authorization method for authorizing unlocking of a smart lock.

BACKGROUND ART

Smart locks with which door locks can be automatically unlocked using a smartphone and the like have been developed (see Non Patent Literature 1).

In a host registration phase, a terminal of a host (such as a smartphone) uses a downloaded application to register an account in a cloud management server and registers the host in a smart lock. The host terminal generates a public key and a private key using the application, and transmits the public key to the smart lock.

In a host entry phase, the terminal of the host connects to the smart lock by means of Bluetooth or the like, when an unlocking button of the application is tapped. The smart lock performs authentication on the host by using the public key (challenge/response).

On the other hand, in a guest invitation phase, the terminal of the host acquires a temporary URL from the management server for performing an invitation procedure, and transmits the temporary URL to a terminal of a guest by means of an email or an SNS. When the terminal of the guest accesses the URL and requests for an invitation, the terminal of the host is notified of the invitation request, and the terminal of the host performs an approval procedure. Then, the management server transmits an electronic certificate that is associated with the corresponding smart lock, to the terminal of the guest.

In a guest entry phase, the terminal of the guest connects to the smart lock by means of Bluetooth or the like, when an unlocking button of the application is tapped, as in the host entry phase. The smart lock performs authentication on the guest by using the electronic certificate.

CITATION LIST

Non Patent Literature

Non Patent Literature 1: Qrio Smart Lock [online], [Searched on Aug. 10, 2018], Internet <URL; https://qrio.me/smartlock>

SUMMARY OF THE INVENTION

Technical Problem

When inviting a guest, the host acquires the guest invitation URL, makes a contact for invitation (transmission of guest invitation URL to the guest terminal), and performs the approval for each guest. Thus, a large load is imposed on the host when there are a large number of guests or when guests are frequently invited. When inviting a guest whom the host is not acquainted with, the host makes a contact for guest invitation based on an email address, an SNS account, or the like. Thus, it is difficult to sufficiently confirm the guest, meaning that there is a risk of identity theft. Furthermore, the guest invitation URL on the guest terminal may be peeped or shared by a third party, meaning that there is a risk of a third party unwanted by the host can be invited.

The present invention is made in view of the above, and an object of the present invention is to provide an authorization system and an authorization method capable of reducing a load on a host regarding an invitation procedure in a case where there is a large number of guests or guests are frequently invited, and preventing identity theft or invitation of an unwanted third party.

Means for Solving the Problem

To solve the above problem, an authorization system according to the present invention includes a non-representative guest terminal, a representative guest terminal, a host terminal, a management server, and a smart lock. The representative guest terminal acquires information about the non-representative guest terminal from the non-representative guest terminal, and signs information about the representative guest terminal and the information about the non-representative guest terminal acquired. The host terminal acquires the information about the representative guest terminal and the information about the non-representative guest terminal that are signed from the representative guest terminal, verifies the information about the representative guest terminal and the information about the non-representative guest terminal that are signed, and signs the information about the representative guest terminal and the information about the non-representative guest terminal that are proven to be authentic by the verification. The management server acquires from the host terminal, information about the host terminal and the information about the representative guest terminal and the information about the non-representative guest terminal that are signed, verifies the information about the representative guest terminal and the information about the non-representative guest terminal that are signed, performs authentication based on the information about the host terminal acquired and information about the host terminal registered in advance when the information is proven to be authentic by the verification, and registers the information about the representative guest terminal and the information about the non-representative guest terminal when the authentication is successful. The management server acquires information about a terminal from the smart lock, performs authentication based on the information about the representative guest terminal and the non-representative guest terminal registered and the information about the terminal acquired from the smart lock, and unlocks the smart lock depending on a result of the authentication.

Examples of the information about each terminal include key information such as a public key. With this configuration, the representative guest terminal performs the invitation procedure on behalf of the non-representative guest terminal, so that the host terminal only needs to perform the invitation procedure with the representative guest terminal. Thus, a load on the host regarding the guest invitation procedure can be suitably reduced in cases such as a case where a large number of guests are invited and a case where the guests include a guest whom the host is not acquainted with. The representative guest terminal serves as a go-between for the host and a non-representative guest whom the host is not acquainted with, whereby that the terminal of the host can invite the non-representative guest after confirming his or her identity so that no uninvited person can pretend to be a guest and the other like risk can be avoided. The information about the terminals is collected in the order of non-representative guest, representative guest, host, and management server. In each collection stage, signing and verification are performed. The guests can be invited with information of their terminals registered when the management server authenticates the information about the host terminal. Thus, the smart lock can be prevented from being unlocked by an unwanted third party.

In the configuration, the representative guest terminal may acquire information about a non-representative guest and the information about the non-representative guest terminal from the non-representative guest terminal, and when a representative guest confirms the information about the non-representative guest, sign the information about the representative guest terminal and the information about the non-representative guest terminal acquired, the host terminal may acquire information about the representative guest and the information about the representative guest terminal and the information about the non-representative guest terminal that are signed from the representative guest terminal, verify the information about the representative guest terminal and the information about the non-representative guest terminal that are signed when a host confirms the information about the representative guest, and sign the information about the representative guest terminal and the information about the non-representative guest terminal when the information is proven to be authentic by the verification.

Examples of the information about the guests include the name, affiliation, the contact information, and the like of the guests. With this configuration, the confirmation using the information about the non-representative guest by the representative guest and the confirmation using the information about the representative latest by the host are additionally performed, so that the identity theft can be more suitably prevented.

An authorization system according to the present invention includes a non-representative guest terminal, a representative guest terminal, a host terminal, a management server, and a smart lock. The non-representative latest terminal has an electronic certificate including information about a non-representative guest. The representative guest terminal has an electronic certificate including information about a representative guest. The non-representative guest terminal signs information about the non-representative guest terminal using the electronic certificate of the non-representative guest. The representative guest terminal acquires information about the non-representative guest terminal that is signed and the electronic certificate of the non-representative guest from the non-representative guest terminal, verifies the information about the non-representative guest terminal that is signed, by using the electronic certificate of the non-representative guest, and signs information about the representative guest terminal and the information about the non-representative guest terminal that is signed and proven to be authentic by the verification by using the electronic certificate of the representative guest. The host terminal acquires from the representative guest terminal, the information about the representative guest terminal and the information about the non-representative guest terminal that are signed, as well as the electronic certificate of the representative guest and the electronic certificate of the non-representative guest, and verifies the information about the representative guest terminal and the information about the non-representative guest terminal that are signed, by using the electronic certificate of the representative guest and the electronic certificate of the non-representative guest. The management server acquires from the host terminal, the information about the representative guest terminal and the information about the non-representative guest terminal that are signed and are verified by the host terminal as well as the electronic certificate of the representative guest and the electronic certificate of the non-representative guest, verifies the information about the representative guest terminal and the information about the non-representative guest terminal that are signed, by using the electronic certificate of the representative guest and the electronic certificate of the non-representative guest, and registers the information about the representative guest terminal and the information about the non-representative guest terminal proven to be authentic by the verification. The management server acquires information about a terminal from the smart lock, performs authentication based on the information about the representative guest terminal and the non-representative guest terminal registered and the information about the terminal acquired from the smart lock, and unlocks the smart lock depending on a result of the authentication.

With this configuration, the representative guest terminal performs the invitation procedure on behalf of the non-representative guest terminal, so that the host terminal only needs to perform the invitation procedure with the representative guest terminal. Thus, a load on the host regarding the guest invitation procedure can be suitably reduced in cases such as a case where a large number of guests are invited and a case where the guests include a guest whom the host is not acquainted with. The representative guest terminal serves as a go-between for the host and a non-representative guest whom the host is not acquainted with, whereby that the terminal of the host can invite the non-representative guest after confirming his or her identity so that no uninvited person can pretend to be a guest and the other like risk can be avoided. The information about the terminals is collected in the order of non-representative guest, representative guest, host, and management server. In each collection stage, signing and verification are performed. The guests can be invited with information of their terminals registered when the management server authenticates the information about the host terminal. Thus, the smart lock can be prevented from being unlocked by an unwanted third party. Furthermore, with the configuration, the electronic certificate is used so that the identity of the guests can be more strictly verified. Examples of the electronic certificate include the information about the guest (such as name, affiliation, and contact information) as in a business card, in the Subject-Name field.

The authorization system may include an information acquisition device, and a certification authority server, in which the information acquisition device may acquire the information about the non-representative guest and the information about the representative guest, and transmit the information to the certification authority server, and the certification authority server may generate the electronic certificate of the non-representative guest based on the information about the non-representative guest to transmit the electronic certificate to the non-representative guest terminal, and generate the electronic certificate of the representative guest based on the information about the representative guest to transmit the electronic certificate to the representative guest terminal.

The authorization system may include a communication carrier server, and a certification authority server, in which the communication carrier server may transmit information about the non-representative guest and information about the representative guest terminal stored in advance to the certification authority server based on a request from the non-representative guest terminal and the representative guest terminal, and the certification authority server may generate the electronic certificate of the non-representative guest based on the information about the non-representative guest to transmit the electronic certificate to the non-representative guest terminal, and generate the electronic certificate of the representative guest based on the information about the representative guest to transmit the electronic certificate to the representative guest terminal.

With the configuration, the electronic certificate can be issued using the information for which the identity verification has been performed by the communication carrier, contract information, and the like, whereby the guests can acquire the electronic certificate with a lower load imposed thereon.

An authorization method according to the present invention is an authorization method performed by an authorization system that includes a non-representative guest terminal, a representative guest terminal, a host terminal, a management server, and a smart lock. The authorization method includes at the representative guest terminal, acquiring information about the non-representative guest terminal from the non-representative guest terminal, and signing information about the representative guest terminal and the information about the non-representative guest terminal acquired to transmit the information to the host terminal, at the host terminal, acquiring the information about the representative guest terminal and the information about the non-representative guest terminal that are signed from the representative guest terminal, verifying the information about the representative guest terminal and the information about the non-representative guest terminal that are signed, and signing the information about the representative guest terminal and the information about the non-representative guest terminal that are proven to be authentic by the verification to transmit the information together with information about the host terminal to the management server; at the management server, acquiring from the host terminal, information about the host terminal and the information about the representative guest terminal and the information about the non-representative guest terminal that are signed, verifying the information about the representative guest terminal and the information about the non-representative guest terminal that are signed, performing authentication based on the information about the host terminal acquired and information about the host terminal registered in advance when the information is proven to be authentic by the verification, and registering the information about the representative guest terminal and the information about the non-representative guest terminal when the authentication is successful; and at the management server, acquiring information about a terminal from the smart lock, performing authentication based on the information about the representative guest terminal and the non-representative guest terminal registered and the information about the terminal acquired from the smart lock, and unlocking the smart lock depending on a result of the authentication.

Effects of the Invention

With present invention, in an authorization system for unlocking a smart lock, a load on a host regarding an invitation procedure can be reduced in a case where there are a large number of guests and guests are frequently invited, and identity theft or invitation of an unwanted third party can be prevented.

DESCRIPTION OF EMBODIMENTS

An authorization system according to an embodiment of the present invention will be described in an example where three guests (including one representative guest) visit the home of a host, with reference to the drawings.

First Embodiment

Figure 1:
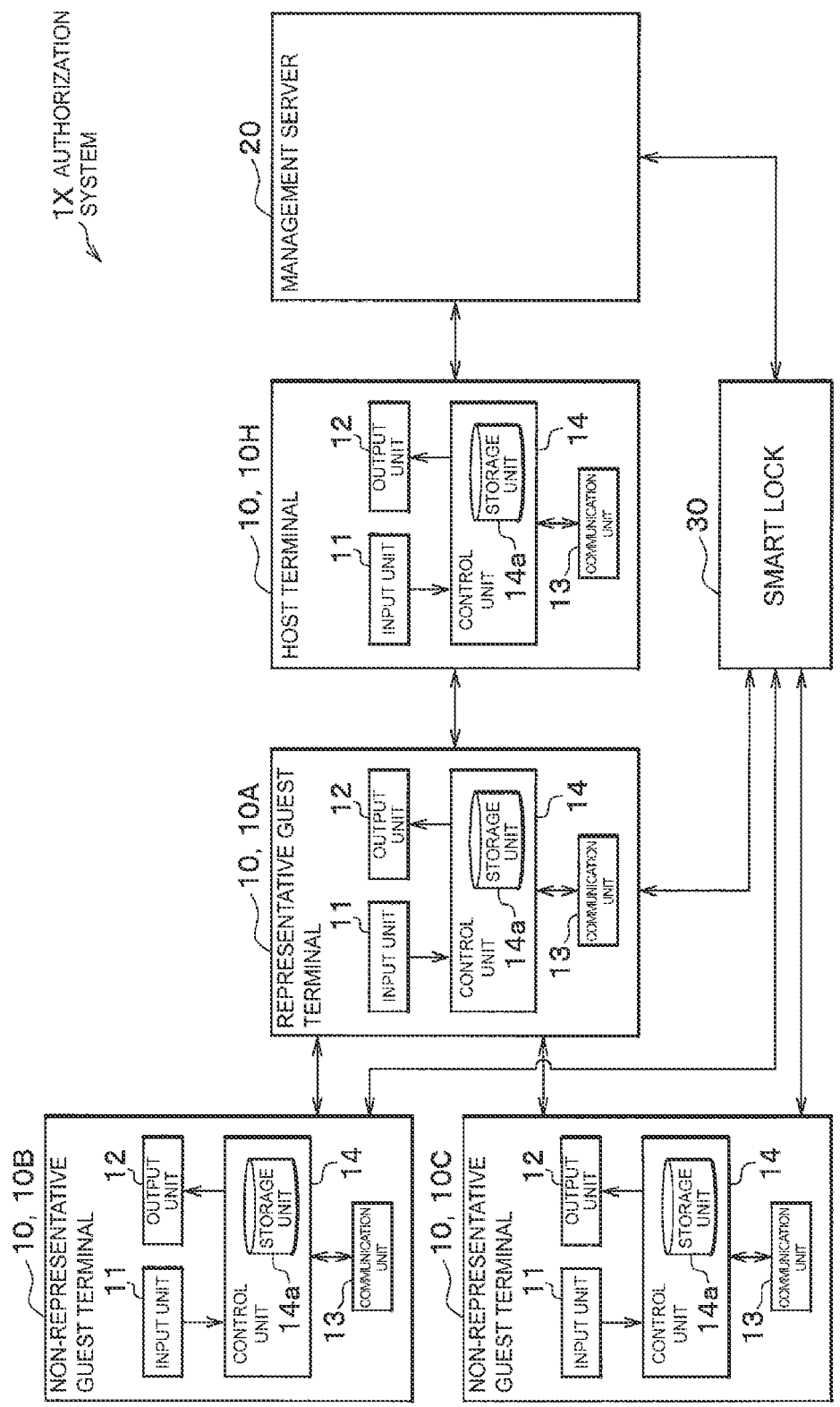
FIG. 1 is a schematic view of an authorization system according to a first embodiment of the present invention.

As illustrated in FIG. 1, an authorization system 1X according to a first embodiment of the present invention includes a plurality of terminals 10 (10A to 10C, and 10H), a management server 20, and a smart lock 30. The plurality of terminals 10 include: a terminal 10A that is a representative guest terminal owned by a representative guest A; terminals 10B and 10C that are non-representative guest terminals respectively owned by non-representative guests B and C; and a host terminal 10H is a host terminal owned by a host H. The management server 20 performs authentication for the terminals 10A, 10B, and 10C of the respective guests A, B, and C, and unlocks the smart lock 30, provided to a door (entrance) of the residence of the host H. The smart lock 30 is a locking device that can be unlocked based on a result of the authentication using the information obtained by performing short-range wireless communications with the terminals 10A, 10B, and 10C.

Non-Representative Guest Terminal

The terminals 10B and 10C of the non-representative guests B and C start a pre-installed application, and generate, for example, a pair of public key and private key as key information which is an example of information unique to the terminals 10B and 10C. The terminals 10B and 10C are connected to the terminal 10A of the representative guest A through short-range wireless communications (such as Bluetooth or Near Field Communications) when their owners meet in person, and transmits information about the non-representative guests B and C (identification information about the non-representative guest such as the name, affiliation, and contact information for example) and the public key to the terminal 10A (the transmission can be implemented using the Internet, WiFi, or the like). In this process, the terminals 10B and 10C add a nonce (random number) to prevent the information about the non-representative guest and the public key from being acquired by a third party to be fraudulently reused (replay attack). The terminals 10B and 10C establish a secure session with the terminal 10A by impressions and encryption. Note that the scheme of communications between the terminals 10B and 10C and the terminal 10A is not limited to the short-range wireless communications.

Representative Guest Terminal

The terminal 10A of the representative guest A starts a pre-installed application, and generate, for example, a pair of public key and private key as key information which is an example of information unique to the terminal 10A. Furthermore, the terminal 10A receives the information about the non-representative guests and the public key in person from the terminals 10B and 10C of the non-representative guests B and C, and signs the public keys of the terminals 10A, 10B, and 10C using the private key of the terminal 10A. The terminal 10A is connected to the terminal 10H of the host H through short-range wireless communications (such as Bluetooth or Near Field Communications) when their owners meet in person, and transmits information about the non-representative guest, information about the representative guest A (identification information about the representative guest such as the name, affiliation, and contact information for example) and the group of signed public keys to the terminal 10H (the transmission can be implemented using the Internet, WiFi, or the like). In this process, the terminal 10A adds a nonce (random number) to prevent the information about the guests and the group of signed public keys from being acquired by a third party to be fraudulently reused (replay attack). The terminal 10A establishes a secure session with the terminal 10H by impressions and encryption. Note that the scheme of communications between the terminal 10A and the terminal 10H is not limited to the short-range wireless communications.

Host Terminal

The terminal 10H of the host H starts a pre-installed application, and receives the information about the guests from the terminal 10A of the representative guest A and the group of signed public keys when their owners meet in person. The terminal 10H verifies the signature of the group of signed public keys using the public key of the terminal 10A included in the group of signed public keys. When the authenticity of the group of signed public key is successfully confirmed by the verification, the terminal 10H signs the group of signed public keys using a private key of the host H. The terminal 10H accesses the management server 20 via the Internet. Then, the management server 20 performs authentication for the terminal 10H of the host H, through a combination of biometric authentication and authentication using public key/private key. After the authentication by the management server 20, the terminal 10H transmits the information about the guests, the group of public keys signed by the host, entry information (such as entry location and entry time) to the management server 20 using encryption based on the TLS, and requests for guest invitation. In this process, the terminal 10H adds a nonce (random number) to prevent the information about the guests and the group of signed public keys from being acquired by a third party to be fraudulently reused (replay attack).

Note that the signing (electronic signature) includes: calculating the hash value of the signing target (for example, the non-representative guest public key) using a hash function; and encrypting the calculated hash value using the private key. As one example, the signed public key of the terminal 10B generated by the signature by the terminal 10A includes a plaintext (public key of the terminal 10B), a ciphertext (a hash value obtained from the public key of the terminal 10B and encrypted using the private key of the terminal 10A), and the public key of the terminal 10A. The verifying includes: calculating a hash value of the received plaintext (the public key of the terminal 10B that is a signing target) using the hash function; comparing the hash value with the hash value as a result of decoding the received ciphertext using the public key of the terminal 10A; and confirming that the signature is authentic when the values match.

Management Server

The management server 20 receives the information about the guests, the group of signed public keys signed by the host, and the entry information from the terminal 10H of the host H, and performs verification on the signature of the group of signed public keys signed by the host using the public key of the host registered in the management server 20. When the verification results in successful confirmation of the authenticity of the group of signed public keys signed by the host, the management server 20 registers the public keys of the guests as well as the information about the guests and the entry information in association with the public key of the host. When each guest enters a room, the guest terminal and the smart lock are connected to each other by a short-range wireless communications such as Bluetooth or NFC. Then, the management server 20 performs authentication using the private keys stored by the terminals 10A, 10B, and 10C of the guests and the public keys registered in the management server 20 via the smart lock 30, and unlocks the smart lock 30.

Terminal

The terminal 10 is a smartphone or the like that can be carried around by a user for example, and includes an input unit 11, an output unit 12, a communication unit 13, and a control unit 14.

Input Unit

The input unit 11 includes a keyboard, a mouse, a touch panel, a camera, and the like, and outputs the result of an operation by the user (the owner of the terminal), the result of image capturing for authentication, and the like to the control unit 14.

Output Unit

The output unit 12 includes a speaker, a display, and the like, and outputs sound, an image, and the like under control by the control unit 14.

Communication Unit

The communication unit 13 performs short-range wireless communications (such as Near Field Communications (NFC) and Bluetooth) with the other terminal 10 and the smart lock 30, wireless communications with the management server 20 in the terminal 10H, and the like.

Control Unit

The control unit 14 includes a central processing unit (CPU), a read-only memory (ROM), a random access memory (RAM), an input/output circuit, and the like. A storage unit 14a of the control unit 14 stores a corresponding application, user information (such as the name) and authentication information (such as fingerprint and image). The control unit 14 executes the functions in an operation example described later, with the application stored in the storage unit 14a installed.

For example, the control unit 14 performs authentication on a user operating the terminal 10, by comparing the authentication information that is an image captured by the input unit 11, and authentication information stored in advance in the storage unit 14a.

The control unit 14 generates the public key and the private key as key information corresponding to the terminal 10. The control unit 14 stores the generated private key in a secure region of the terminal 10 so as not to be taken out from the terminal 10 in principle. When performing the signing, authentication, and the like using the private key, the control unit 14 confirms the user operating the terminal 10 in advance by biometric authentication.

The control unit 14 of the terminal 10A of the representative guest A acquires the key information (public key) of the non-representative guests B and C as well as the information about the non-representative guests B and C from the terminals 10B and 10C by performing short-range wireless communications with the control units 14 of the terminals 10B and 10C of the non-representative guests B and C via the communication units 13.

The control unit 14 of the terminal 10H of the host H acquires, from the terminal 10A, the key information (public key) of the guests A, B, and C as well as the information about the guests A, B, and C by performing short-range wireless communications with the terminal 10A of the representative guest A via the communication units 13.

Thus, in the authorization system 1X, when the host H performs an invitation procedure for the representative guest A, invitation procedures for the other non-representative guests B and C are completed. Thus, a smaller load is imposed on the host H for performing the invitation procedure, in a case where the number of guests of the frequency of invitation increases. In the authorization system 1X, the representative guest A performs the invitation procedure on behalf of the non-representative guests B and C, and thus the invitation procedure is performed with the representative guest A serving as a go-between so that identity theft can be prevented even when there is a guest whom the host H is not acquainted with.

The management server 20 communicate with the control unit 14 of the terminal 10H of the host H, to acquire the key information (public key) of the guests A, B, and C, the information about the guests A, B, and C, and the entry information (such as the room number and the entry time) from the terminal 10H.

The smart lock 30 performs short-range wireless communications with the control units 14 of the terminals 10A, 10B, and 10C of the guests A, B, and C to acquire the key information (public key) of the guests A, B, and C as well as the information about the guests A, B, and C from the terminals 10A, 10B, and 10C. The smart lock 30 communicates with the management server 20 using the key information and the information about the guests A, B, and C thus acquired, to make the management server 20 determine whether the smart lock 30 is to be unlocked, and is unlocked depending on the result of the determination.

The related art involves a risk that an unwanted third party may peep a guest invitation URL and make a visit. In view of this, the authorization system 1X performs authentication using the information about the guests A, B, and C transmitted from the terminal 10H of the host H, so that the smart lock 30 can be prevented from unlocking for an unwanted third party making a visit.

EXAMPLE OPERATION

Next, an example operation of the authorization system 1X according to the first embodiment of the present invention will be described. This example operation is performed under conditions that: the control unit 14 of the terminal 10H carried around by the host H has already generated a public key KpH and a private key KsH; and the account and the public key KpH of the terminal 10H have been registered in the management server 20.

Figure 2:
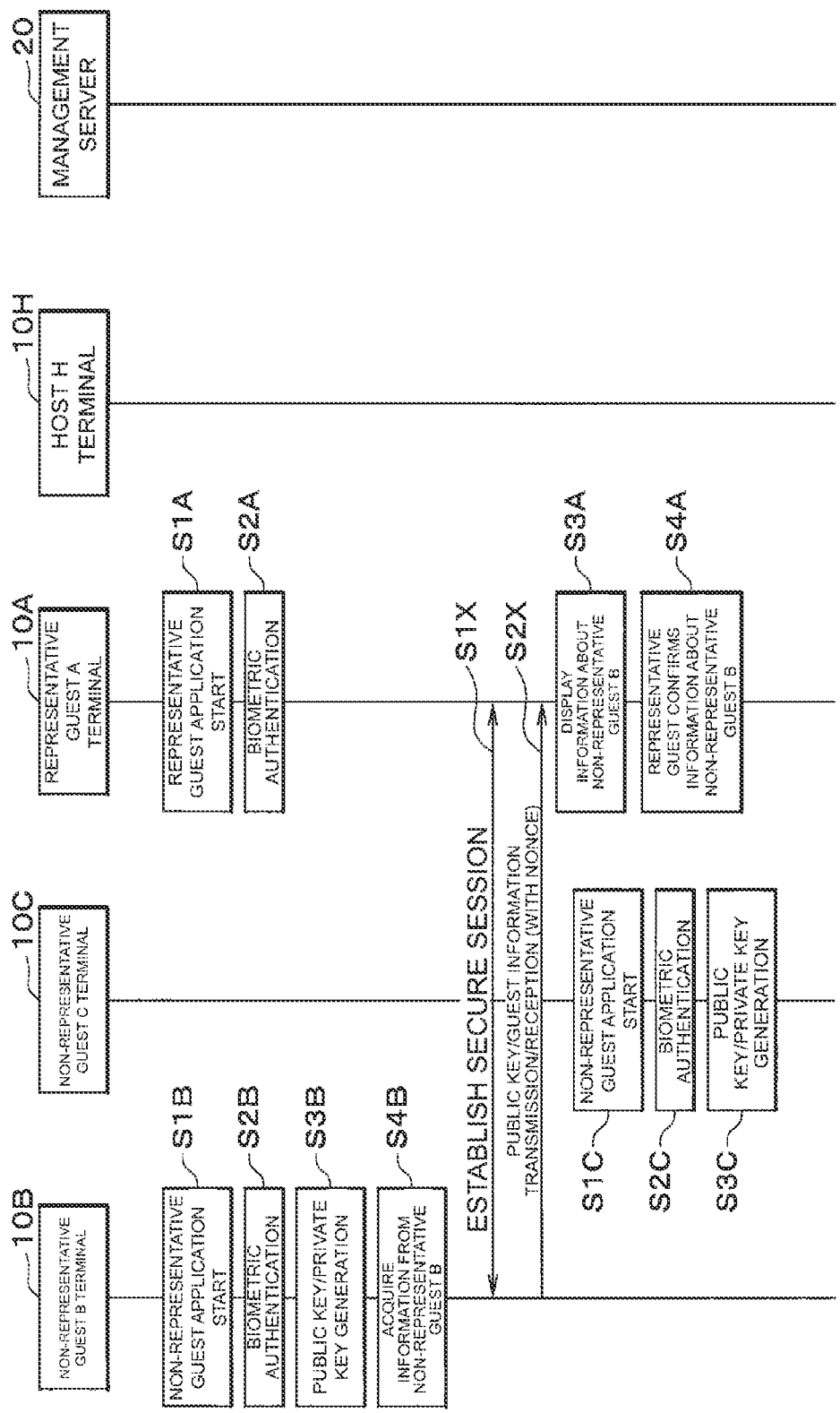
FIG. 2 is a sequence diagram illustrating an example operation for guest invitation in the authorization system according to the first embodiment of the present invention.

As illustrated in FIG. 2, when the representative guest A operates the input unit 11 of the terminal 10A, the control unit 14 of the terminal 10A starts the representative guest application (step S1A) and performs the following operations with the representative guest application. Next, the control unit 14 of the terminal 10A performs biometric authentication (step S2A). Here, it is assumed that the control unit 14 of the terminal 10A has confirmed that the user that started the representative guest application is the representative guest A by biometric authentication.

Here, in the present example operation, the information about the non-representative guest B and the public key of the terminal 10B are collected into the terminal 10A of the representative guest A. Thus, when the non-representative guest B operates the input unit 11 of the terminal 10B, the control unit 14 of the terminal 10B starts the non-representative guest application (step S1B) and performs the following operations with the non-representative guest application. The control unit 14 of the terminal 10B performs biometric authentication (step S2B). Upon confirming that the user who started the non-representative guest application is the non-representative guest B through the biometric authentication, the control unit 14 of the terminal 10B generates the public key KpB and the private key KsB (step S3B).

Next, the control unit 14 of the terminal 10B acquires information (such as the name and affiliation) of the non-representative guest B (step S4B). Here, the control unit 14 of the terminal 10B may display a screen on the output unit 12 to make the non-representative guest B operate the input unit 11 for acquiring the information about the non-representative guest B, or may acquire from the storage unit 14a, the information about the non-representative guest B set in advance at the point when the non-representative guest application is installed.

When the representative guest A and the non-representative guest B operate the input units 11 of their terminals 10A and 10B upon meeting in person and confirming each other, the control units 14 of the terminals 10A and 10B establish a secure session through short-range wireless communications via the communication units 13 (step S1X). Next, the control unit 14 of the terminal 10B transmits the public key KpB and the information about the non-representative guest B via the communication unit 13, and the control unit 14 of the terminal 10A receives the public key KpB and the information about the non-representative guest B via the communication unit 13 (step S2X). Note that, in the present example operation, when the group of public keys and the like are transmitted, the nonce (the random number from which the public key and the private key are derived) is also transmitted (the same applies in the following description).

The control unit 14 of the terminal 10A causes the output unit 12 to display the information about the non-representative guest B (step S3A). When the representative guest A operates the input unit 11 of the terminal 10A, while watching the information about the non-representative guest B displayed, the control unit 14 of the terminal 10A confirms that the public key KpB belongs to the non-representative guest B (step S4A). Thus, the control unit 14 of the terminal 10A performs the following operation when the identity of the non-representative guest B has been guaranteed through the confirmation of the information about the non-representative guest B by the representative guest A.

Similarly, in the present example operation, the information about the non-representative guest C and the public key of the terminal 10C is collected into the terminal 10A of the representative guest A. Thus, when another non-representative guest C operates the input unit 11 of the terminal 10C, the control unit 14 of the terminal 10C starts the non-representative guest application (step S1C) and performs the following operations with the non-representative guest application. The control unit 14 of the terminal 10C performs biometric authentication (step S2C). Upon confirming that the user who started the non-representative guest application is the non-representative guest C through the biometric authentication, the control unit 14 of the terminal 10C generates the public key KpC and the private key KsC (step S3C).

Figure 3:
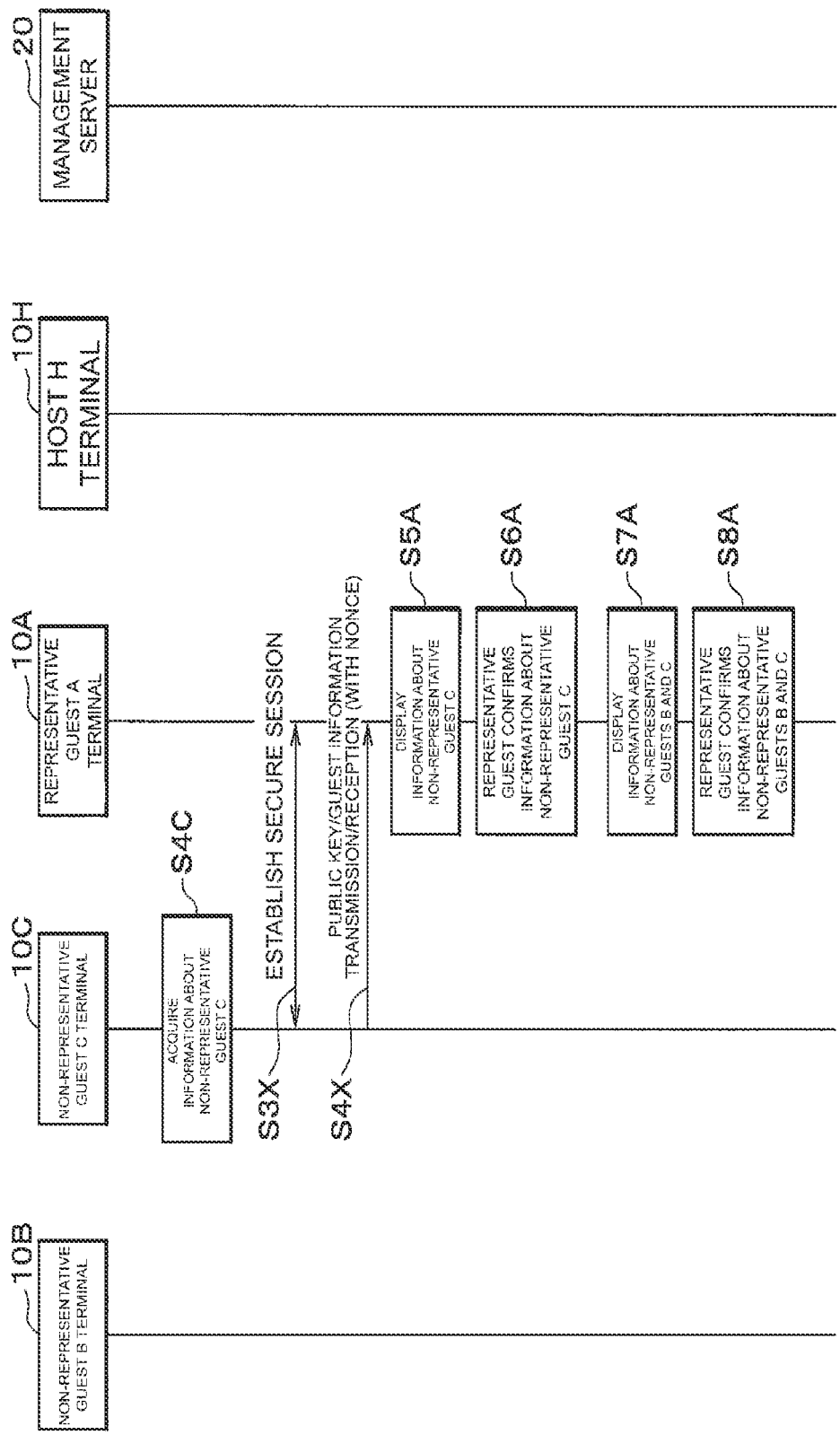
FIG. 3 is a sequence diagram illustrating an example operation for guest invitation in the authorization system according to the first embodiment of the present invention.
Figure 4:
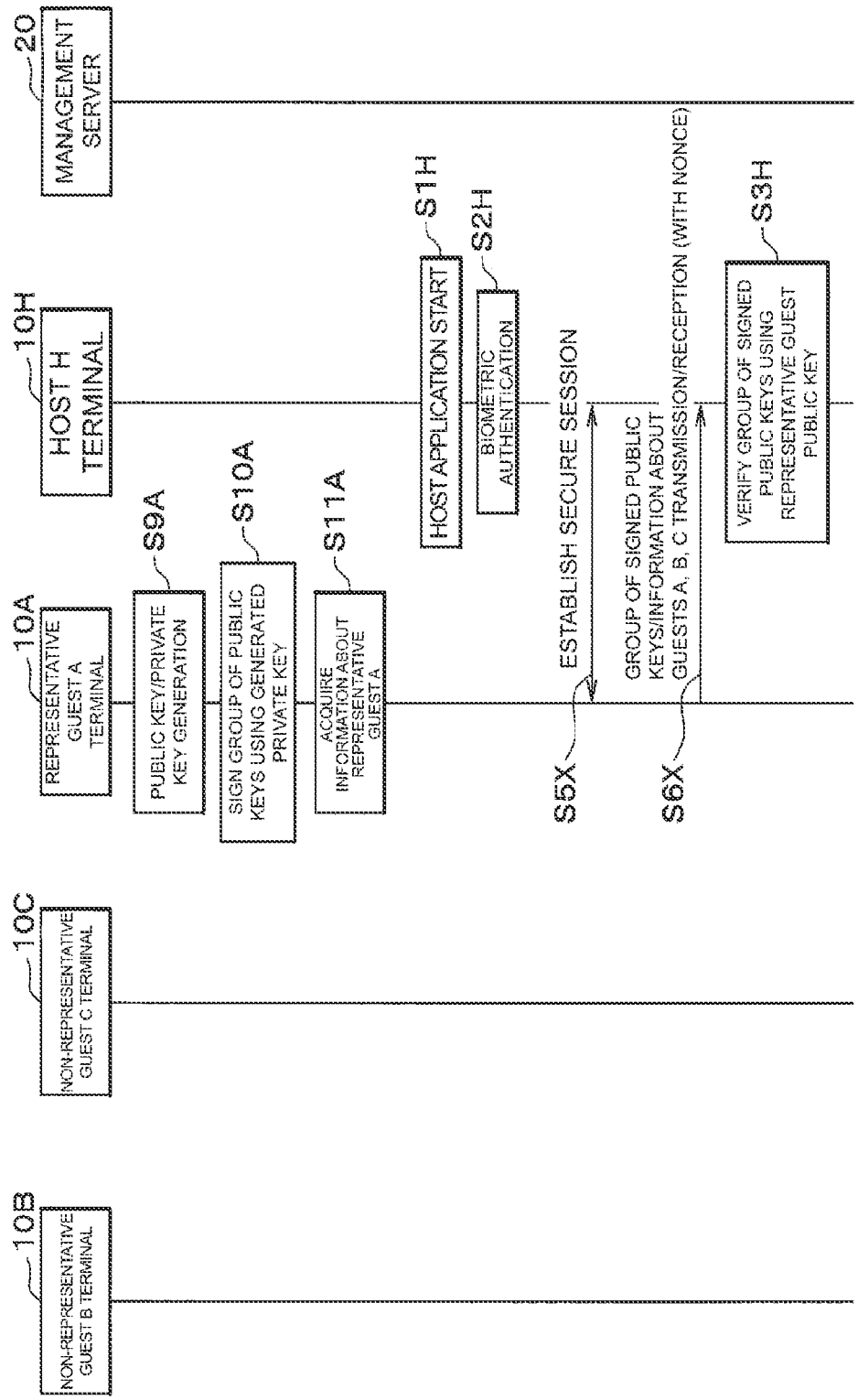
FIG. 4 is a sequence diagram illustrating an example operation for guest invitation in the authorization system according to the first embodiment of the present invention.

Next, as illustrated in FIG. 3, the control unit 14 of the terminal 10C acquires information (such as the name and affiliation) of the non-representative guest C (step S4C). Here, the control unit 14 of the terminal 10C may display a screen on the output unit 12 to make the non-representative guest C operate the input unit 11 for acquiring the information about the non-representative guest C, or may acquire the information about the non-representative guest C set in advance at the point when the non-representative guest application is installed, from the storage unit 14a.

When the representative guest A and the non-representative guest C operate the input units 11 of their terminals 10A and 10C upon meeting in person and confirming each other, the control units 14 of the terminals 10A and 10C establish a secure session through short-range wireless communications (step S3X). Next, the control unit 14 of the terminal 10C transmits the public key KpC and the information about the non-representative guest C via the communication unit 13, and the control unit 14 of the terminal 10B receives the public key KpC and the information about the non-representative guest C via the communication unit 13 (step S4X).

The control unit 14 of the terminal 10A causes the output unit 12 to display the information about the non-representative guest C (step S5A). When the representative guest A operates the input unit 11 of the terminal 10A, while watching the information about the non-representative guest C displayed, the control unit 14 of the terminal 10A confirms that the public key KpC belongs to the non-representative guest C (step S6A). Thus, the control unit 14 of the terminal 10A performs the following operation when the identity of the non-representative guest C has been through the confirmation of the information about the non-representative guest C by the representative guest A.

Next, in the present example operation, the information about the non-representative guests B and C and the public keys of the terminals 10B and 10C, as well as the information about the representative guest A and the public key of the terminal 10A are transmitted from the terminal 10A of the representative guest A to the terminal 10H of the host H. First of all, the control unit 14 of the terminal 10A causes the output unit 12 to display the information about the non-representative guests B and C (step S7A). When the representative guest A operates the input unit 11 of the terminal 10A, while watching the information about the non-representative guests B and C displayed, the control unit 14 of the terminal 10A confirms that all the non-representative guests B and C have arrived (step S8A).

Subsequently, the control unit 14 of the terminal 10A generates a public key KpA and a private key KsA (step S9A). Next, the control unit 14 of the terminal 10A signs the group of public keys KpA, KpB, and KpC using the generated private key KsA to generate the group of signed public keys Sig (KpA, KpB, KpC) (step S10A).

Next, the control unit 14 of the terminal 10A acquires information (such as the name and affiliation) about the representative guest A (step S11A). Here, the control unit 14 of the terminal 10A may display a screen on the output unit 12 to make the representative guest A operate the input unit 11 for acquiring the information about the representative guest A, or may acquire the information about the representative guest A set in advance at the point when the representative guest application is installed, from the storage unit 14a.

On the other hand, when the host H operates the input unit 11 of the terminal 10H, the control unit 14 of the terminal 10H starts a host application (step S1H) and performs the following operations with the host application. The control unit 14 of the terminal 10H performs biometric authentication (step S2H). Here, it is assumed that the control unit 14 of the terminal 10H has confirmed that the user that started the host application is the host H by biometric authentication.

When the host H and the representative guest A operate the input units 11 of their terminals 10H and 10A upon meeting in person and confirming each other, the control units 14 of the terminals 10H and 10A establish a secure session through short-range wireless communications via the communication units 13 (step SSX). Next, the control unit 14 of the terminal 10A transmits, via the communication unit 13, the group of signed public keys Sig (KpA, KpB, KpC) and the information about the guests A, B, and C. The control unit 14 of the terminal 10H receives, via the communication unit 13, the group of signed public keys Sig (KpA, KpB, KpC) and the information about the guests A, B, and C (step S6X).

Next, in the present example operation, the information about the guests A, B, and C, the public keys of the terminals 10A, 10B, and 10C, and the entry information are transmitted from the terminal 10H of the host H to the management server 20. First of all, the control unit 14 of the terminal 10H verifies the group of signed public keys Sig (KpA, KpB, KpC) using the public key KpA received together with the group of signed public keys Sig (KpA, KpB, KpC) (step S3H).

Figure 5:
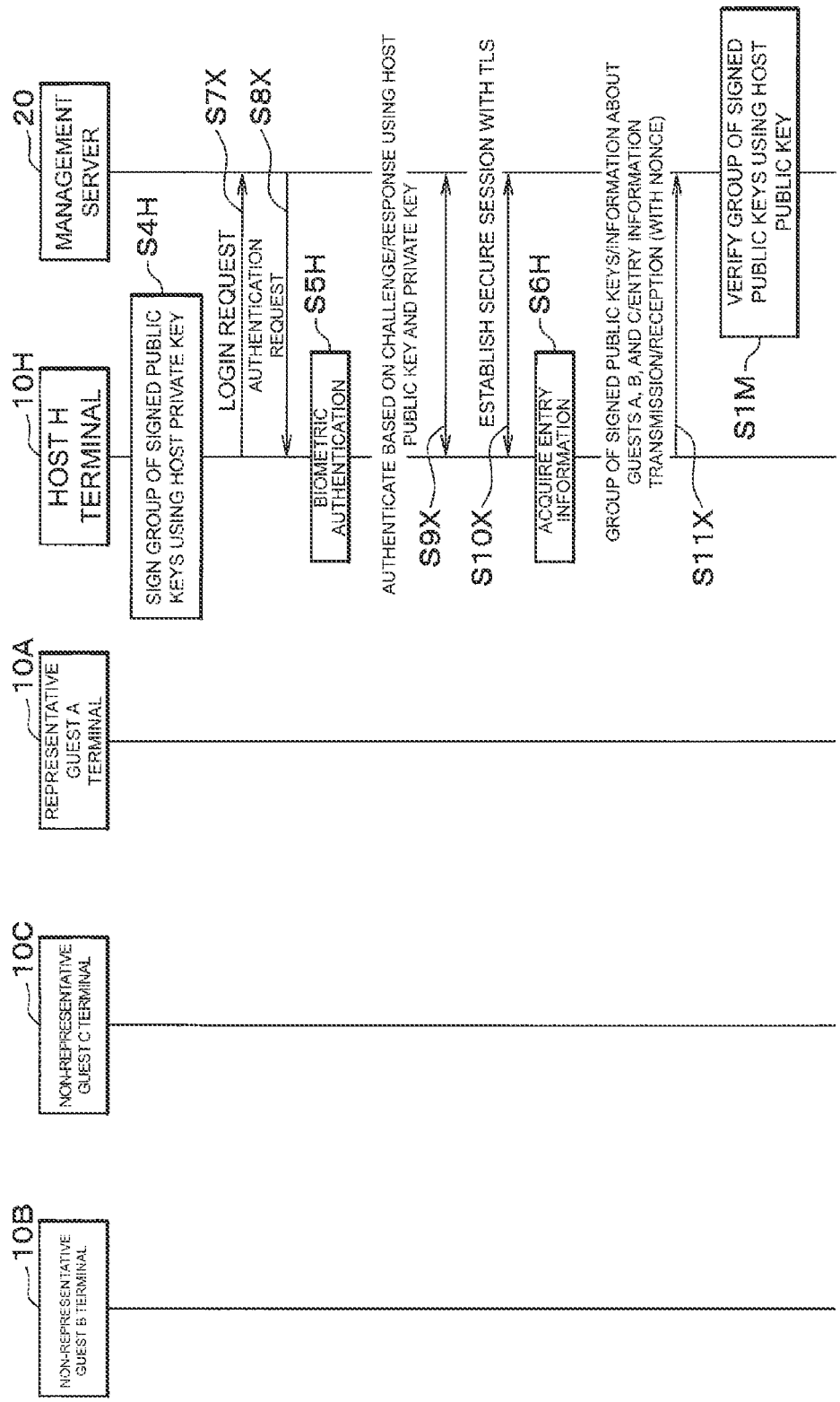
FIG. 5 is a sequence diagram illustrating an example operation for guest invitation in the authorization system according to the first embodiment of the present invention.
Figure 6:
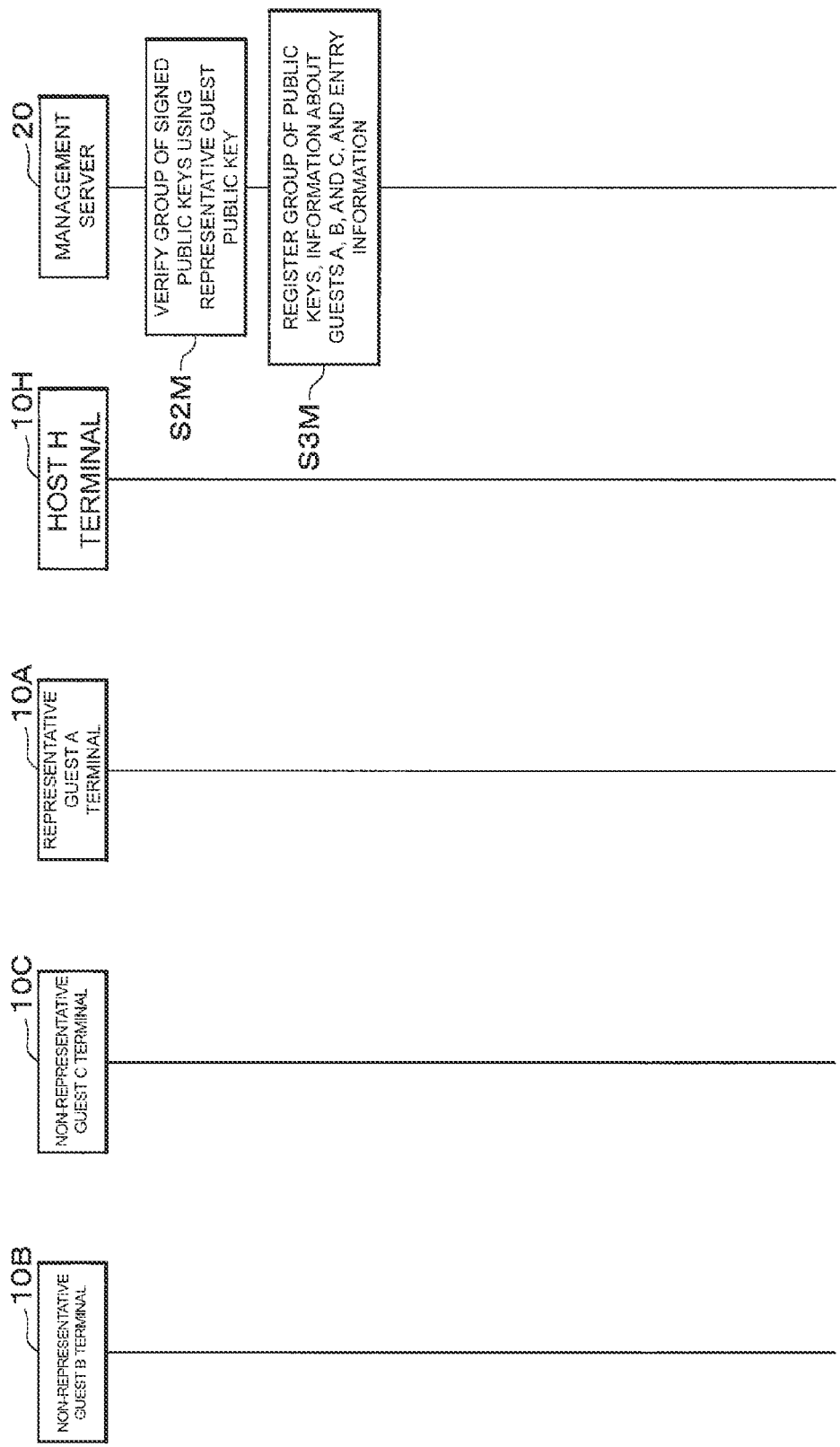
FIG. 6 is a sequence diagram illustrating an example operation for guest invitation in the authorization system according to the first embodiment of the present invention.

As illustrated in FIG. 5, the control unit 14 of the terminal 10H further signs the group of signed public keys Sig (KpA, KpB, KpC) using the private key KsH to generate the group of signed public keys Sig (Sig (KpA, KpB, KpC)) (step S4H). Next, when the host H operates the input unit 11 of the terminal 10H, the control unit 14 of the terminal 10H transmits a login request to the management server 20 via the communication unit 13 (step S7X). Then, upon receiving the login request, the management server 20 transmits an authentication request to the control unit 14 of the terminal 10H (step S8X).

Then, upon receiving the authentication request, the control unit 14 of the terminal 10H performs biometric authentication (step S5H). When the biometric authentication results in the user who transmitted the login request confirmed as the host H, the control unit 14 of the terminal 10H performs authentication with the management server 20, based on challenge/response using the public key KpH and the private key KsH (step S9X). Then, the control unit 14 and the management server 20 of the terminal 10H establish a secure session based on Transport Layer Security (TLS) (step S10X).

Next, when the host H operates the input unit 11 of the terminal 10H, the control unit 14 of the terminal 10H acquires the entry information (room number, entry time zone, and the like) (step S6H). Next, the control unit 14 of the terminal 10H transmits, via the communication unit 13, the group of signed public keys Sig (KpA, KpB, KpC), the information about the guests A, B, and C, and the entry information. The management server 20 receives the group of signed public keys Sig (KpA, KpB, KpC) as well as the information about the guests A, B, and C, and the entry information (step S11X).

Next, in the present example operation, the information about the guests A, B, and C, the public keys of the terminals 10A, 10B, and 10C, and the entry information are registered in the management server 20. First of all, the management server 20 verifies the group of signed public keys Sig (Sig (KpA, KpB, KpC)) using the public key KpH received together with the group of signed public keys Sig (Sig (KpA, KpB, KpC)) (step S1M).

Then, in the present example operation, the group of signed public keys (Sig (KpA, KpB, KpC)) are verified by the management server 20 using the public key KpA (step S2M). Then, the management server 20 registers the group of public keys KpA, KpB, and KpC, the information about the guests A, B, and C, and the entry information in the management server 20 (step S3M). More specifically, the management server 20 performs authentication based on the public key KpH of the host H included in the public key group acquired, as well as the public key KpH of the host H registered in advance in the management server 20, when each verification proves their authenticity. Then, when the authentication is successful (the public keys KpH match), the management server 20 stores the information about the guests A, B, and C, the public keys of the terminals 10A, 10B, and 10C, and the entry information in a storage unit (such as a database) of the management server 20.

Figure 7:
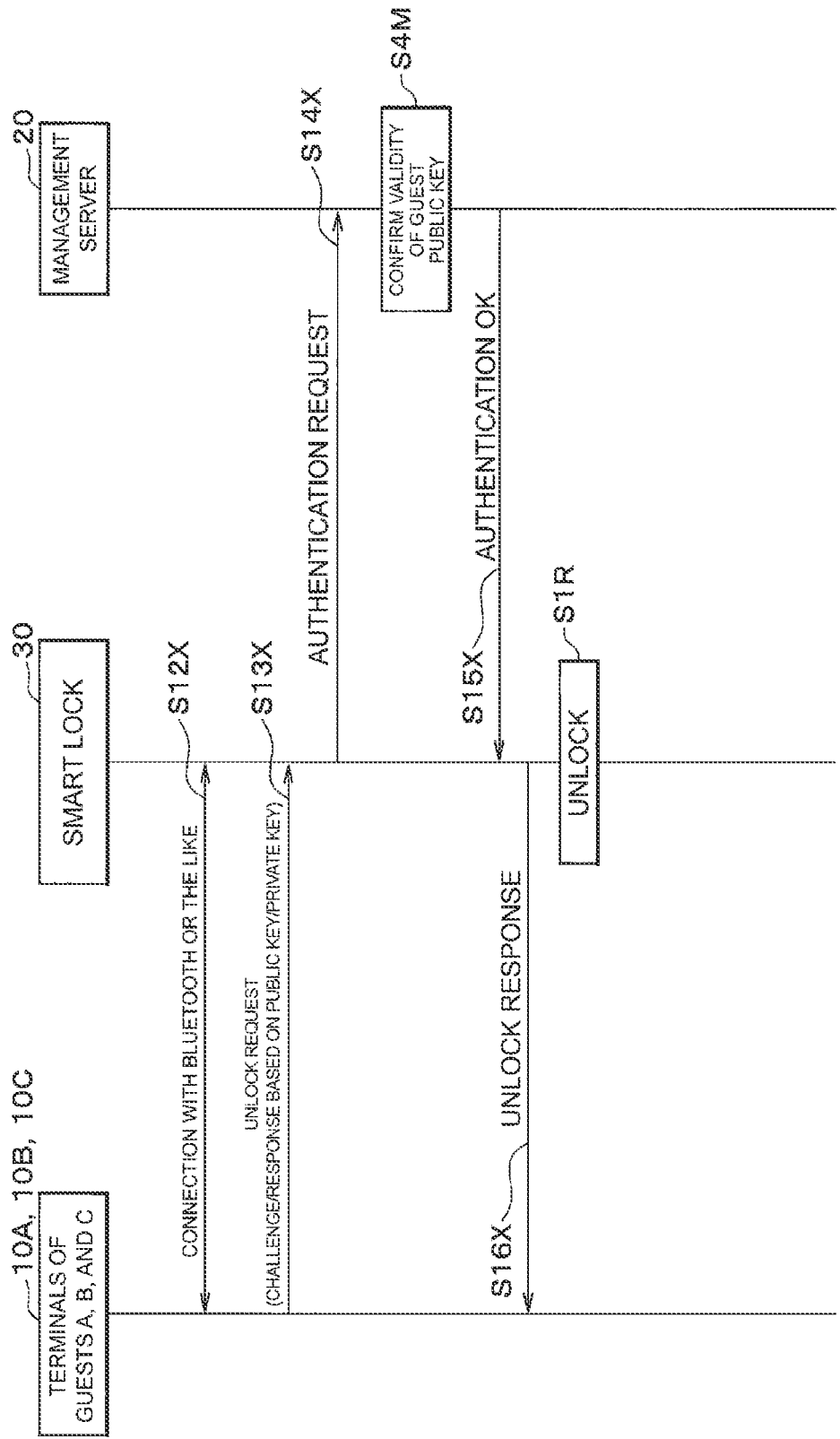
FIG. 7 is a sequence diagram illustrating an example operation for guest entry in the authorization system according to the first embodiment of the present invention.

Next, in the present example operation, an operation for unlocking the smart lock 30 is performed as illustrated in FIG. 7. First of all, when the guests A, B, and C approach the smart lock 30, the control units 14 of the terminals 10A, 10B, and 10C of the guests A, B, and C are automatically connected to the smart lock 30 via the communication units 13 by means of Bluetooth and the like (step S12X). Next, the control units 14 of the terminals 10A, 10B, and 10C of the guests A, B, and C issues an unlock request for the smart lock 30 based on challenge/response using their public keys and private keys (step S13X).

Then, the smart lock 30 transmits an authentication request to the management server 20 using the private key received with the unlock request (step S14X). Then, the management server 20 uses the private key included in the authentication request and the public keys KpA, KpB, and Kpc registered in advance to confirm the validity of the public keys of the guests A, B, and C (step S4M), and determines whether the unlock is to be implemented by comparing the following two information pieces. The first information is the number (room number) of the smart lock and time included in the authentication request. The second information is entry information registered in advance.

Subsequently, when the management server 20 transmits the authentication OK (unlock OK) to the smart lock 30 (step S15X), the smart lock 30 transmits an unlock response to the control units 14 of the terminals 10A, 10B, and 10C (step S16X) and unlocks the smart lock 30 (step S1R).

As a result, the guests A, B, and C can enter the residence of the host H through the door provided with the smart lock 30.

In this manner, in the authorization system 1X, the representative guest terminal 10A acquires the information about the non-representative guest terminals 10B and 10C from the non-representative guest terminals 10B and 10C, and signs the information about the representative guest terminal 10A and the information about the non-representative guest terminals 10B and 10C. The host terminal 10H acquires from the representative guest terminal 10A, the signed information about the representative guest terminal 10A and about the non-representative guest terminals 10B and 10C, verifies the signed information about the representative guest terminal 10A and about the non-representative guest terminals 10B and 10C, and signs the information about the representative guest terminal 10A and about the non-representative guest terminals 10B and 10C that has been proved to be authentic through the verification.

The management server 20 acquires the information about the host terminal 10H and the signed information about the representative guest terminal 10A and about the non-representative guest terminals 10B and 10C from the host terminal 10H, and verifies the signed information about the representative guest terminal 10A and about the non-representative guest terminal 10B. When the information is proven to be authentic by the verification, the management server 20 performs authentication based on the information about the host terminal 10H and the information about the host terminal 10H registered in advance, and registers the information about the representative guest terminal 10A and about the non-representative guest terminals 10B and 10C when the authentication is successful.

The management server 20 acquires the terminal information from the smart lock 30, performs authentication based on the information about the registered representative guest terminal 10A and about the non-representative guest terminals 10B and 10C and of the terminal information acquired from the smart lock, and unlocks the smart lock 30 depending on the authentication result.

More specifically, the representative guest terminal 10A acquires the information about the non-representative guests B and C and the information about the non-representative guest terminals 10B and 10C from the non-representative guest terminals 10B and 10C, and signs the information about the representative guest terminal 10A and the information about the non-representative guest terminals 10B and 10C acquired, when the representative guest A confirms the information about the non-representative guests B and C. Note that the host terminal 10H may have the following configuration. Specifically, the host terminal 10H may be configured to acquire the information about the representative guest 10A, and the signed information about the representative guest 10A and about the non-representative guest terminals 10B and 10C from the representative guest terminal 10A. Furthermore, the host terminal 10H may be configured verify, when the host H confirms the information about the representative guest 10A, the signed information about the representative guest terminal 10A and about the non-representative guest terminals 10B and 10C, and sign the information about the representative guest terminal 10A and about the non-representative guest terminals 10B and 10C when the information is proven to be authentic by the verification.

In an authorization method, the representative guest terminal 10A executes the step of acquiring the information about the non-representative guest terminals 10B and 10C from the non-representative guest terminals 10B and 10C, and signing information about the representative guest terminal 10A and the information about the non-representative guest terminals 10B and 10C to transmit the information to the host terminal 10H.

The host terminal 10H executes the step of acquiring the signed information about the representative guest terminal 10A and about the non-representative guest terminals 10B and 10C from the representative guest terminal 10A, and verifying the signed information about the representative guest terminal 10A and the non-representative guest terminals 10B and 10C. Then, the host terminal 10H executes the step of signing the information about the representative guest terminal 10A and about the non-representative guest terminals 10B and 10C proven to be authentic by the verification to transmit the information to the management server 20 together with the information about the host terminal 10H.

The management server 20 acquires the information about the host terminal 10H and the signed information about the representative guest terminal 10A and about the non-representative guest terminals 10B and 10C from the host terminal 10H, and verifies the signed information about the representative guest terminal 10A and about the non-representative guest terminals 10B and 10C. When the information is proven to be authentic by the verification, the management server 20 executes the step of performing authentication based on the information about the host terminal 10H and the information about the host terminal 10H registered in advance, and registering the information about the representative guest terminal 10A and about the non-representative guest terminals 10B and 10C when the authentication is successful.

The management server 20 executes the step of acquiring the terminal information from the smart lock 30, performing authentication based on the information about the registered representative guest terminal 10A and about the non-representative guest terminals 10B and 10C and of the terminal information acquired from the smart lock 30, and unlocking the smart lock 30 depending on the authentication result.

In the authorization system 1X according to the first embodiment of the present invention, the terminal 10A of the representative guest A collects the key information of terminal 10B of the non-representative guests B and C and transmits the collected information to the terminal 10H of the host H together with the key information of the terminal 10A, whereby a load for the guest invitation procedure on the host H can be reduced. Specifically, the terminal 10H of the host H acquires the information about and the public keys of all the guests A, B, and C from the terminal 10 of the representative guest A, and thus only needs to perform the invitation procedure for the representative guest A. Thus, with the authorization system 1X, a load on the host H regarding the guest invitation procedure can be suitably reduced in cases such as a case where a large number of guests are invited and a case where the guests include a guest whom the host H is not acquainted with.

Furthermore, the authorization system 1X can make the representative guest A meet the non-representative guests B and C in person, and make the host H meet the representative guest A in person due to the following reason. Specifically, they meet because the key information is transmitted between the terminal 10A of the representative guest A and the terminals 10B and 10C of the non-representative guests B and C through short-range wireless communications, and the key information is transmitted between the terminal 10H of the host H and the terminal 10A of the representative guest A through short-range wireless communications. Thus, the terminal 10A of the representative guest A acquires the information about and the public keys of the non-representative guests B and C when the owners meet in person (short-range wireless communications), and signs the public keys of the non-representative guests B and C using the private key of the representative guest A, to guarantee the authenticity to the host H. Furthermore, the terminal 10H of the host H confirms the authenticity of the guest information about and the public keys of the guests B and C by verifying the signature of the representative guest A. Thus, in the authorization system 1X, the terminal 10A of the representative guest A serves as a go-between for the host H and a non-representative guest whom the host H is not acquainted with, whereby that the terminal 10H of the host H can invite the non-representative guest after confirming his or her identity so that identity theft from the guest and the like can be prevented.

In addition, in the authorization system 1X, the guests A, B, and C are invited with the management server server 20 authenticating the host H, and with the terminal 10H of the host H transmitting the information about and the public keys of the guests A, B, and C to the management server. Furthermore, the authenticity of the information about and the public keys of the guests A, B, and C is confirmed with the management server 20 verifying the signature of the host H. Thus, the authorization system 1X can prevent the smart lock 30 from being unlocked by an unwanted third party.

Furthermore, in the authorization system 1X, the public keys of and the information about the guests the signature of which has been verified by the terminal 10H of the host H are stored in the terminal 10H of the host H. Thus, the terminal 10H of the host H can transmit the public keys of and the information about the guests thus stored, when requesting the management server 20 for the guest invitation. Thus, with the authorization system 1X, when the non-representative guests B and C are invited again in the future, they can be invited without the need for going through the procedure with the representative guest A. Furthermore, with the authorization system 1X, guests to be invited can be selected from the public keys of and the information about the guests stored, so that the procedure with the terminal 10A of the representative guest A needs not to be performed each time the terminal 10H of the host H makes an invitation.

Second Embodiment

Figure 8:
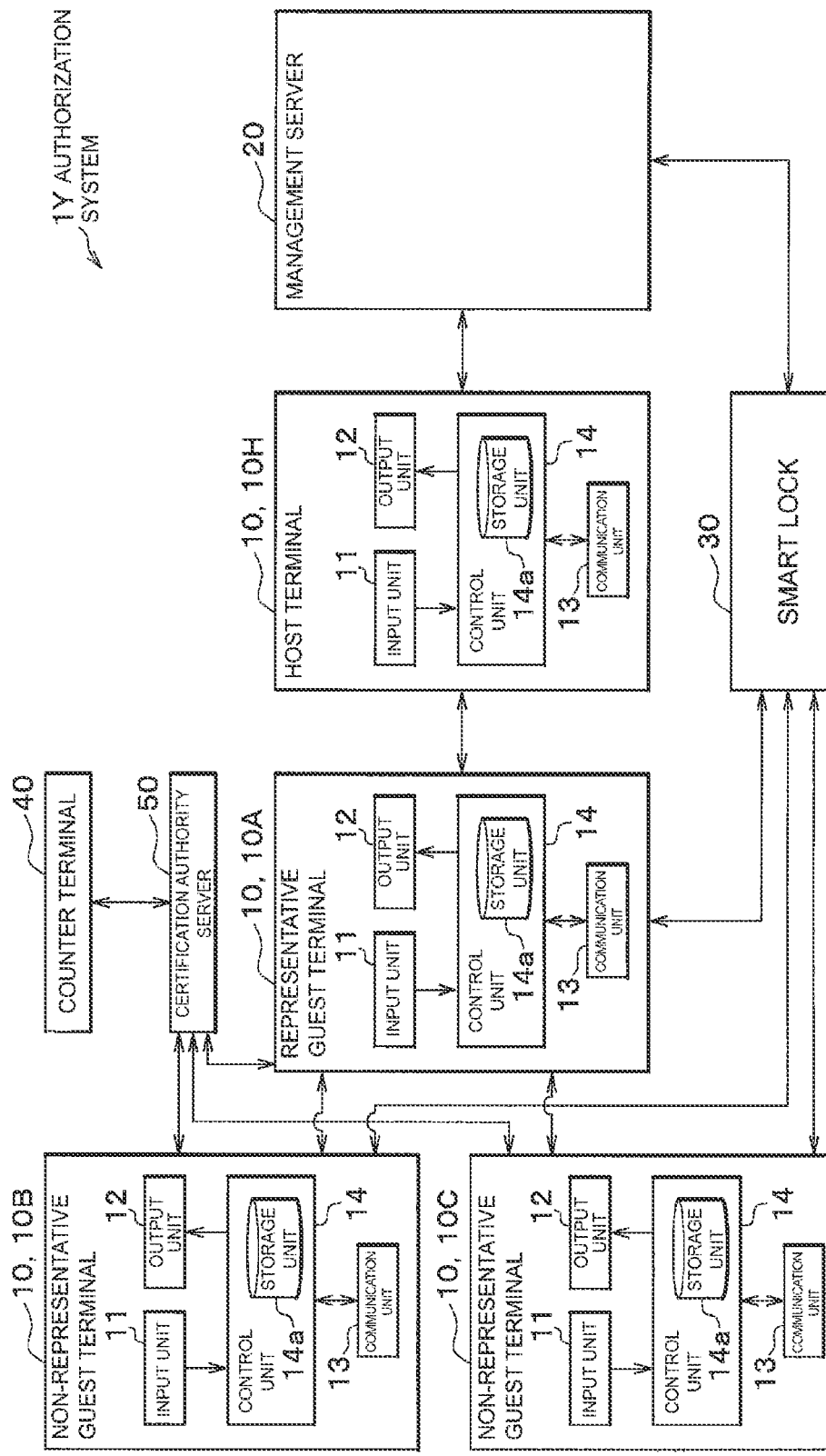
FIG. 8 is a schematic view of an authorization system according to a second embodiment of the present invention.

Next, an authorization system according to a second embodiment of the present invention will be described while focusing on differences from the authorization system 1X according to the first embodiment. As illustrated in FIG. 8, an authorization system 1Y according to the second embodiment of the present invention further includes a counter terminal 40 provided in a store, and a certification authority server 50 that issues an electronic certificate.

Counter Terminal

The counter terminal 40 is, for example, a non-mobile computer provided in a store of a communication carrier visited by the non-representative guests B and C and the representative guest A, and is an information acquisition device that acquires information about the guests A, B, and C based on an operation performed by a store staff while watching an identity verification document brought by the guests A, B, and C. The counter terminal 40 transmits the acquired information about the guests A, B, and C to the certification authority server 50. The counter terminal 40 may be configured to acquire the information about the guests A, B, and C from the terminals 10A, 10B, and 10C.

Certification Authority Server

The certification authority server 50 receives the information about the guests A, B, and C transmitted from the counter terminal 40, generates an electronic certificate for the guests A, B, and C based on the received information about the guests A, B, and C, and transmits the generated electronic certificate to the terminals 10A, 10B, and 10C of the guests A, B, and C. The electronic certificate has a subjectName field or another field including the information (such as the name, affiliation, and contact information) about the corresponding guest. The electronic certificate also has a field, other than the subjectName field, including the public key generated by the terminal of the corresponding guest.

Example Operation

Next, an example operation of the authorization system 1Y according to the second embodiment of the present invention will be described while focusing on differences from the operation example of the authorization system 1X according to the first embodiment.

Figure 9:
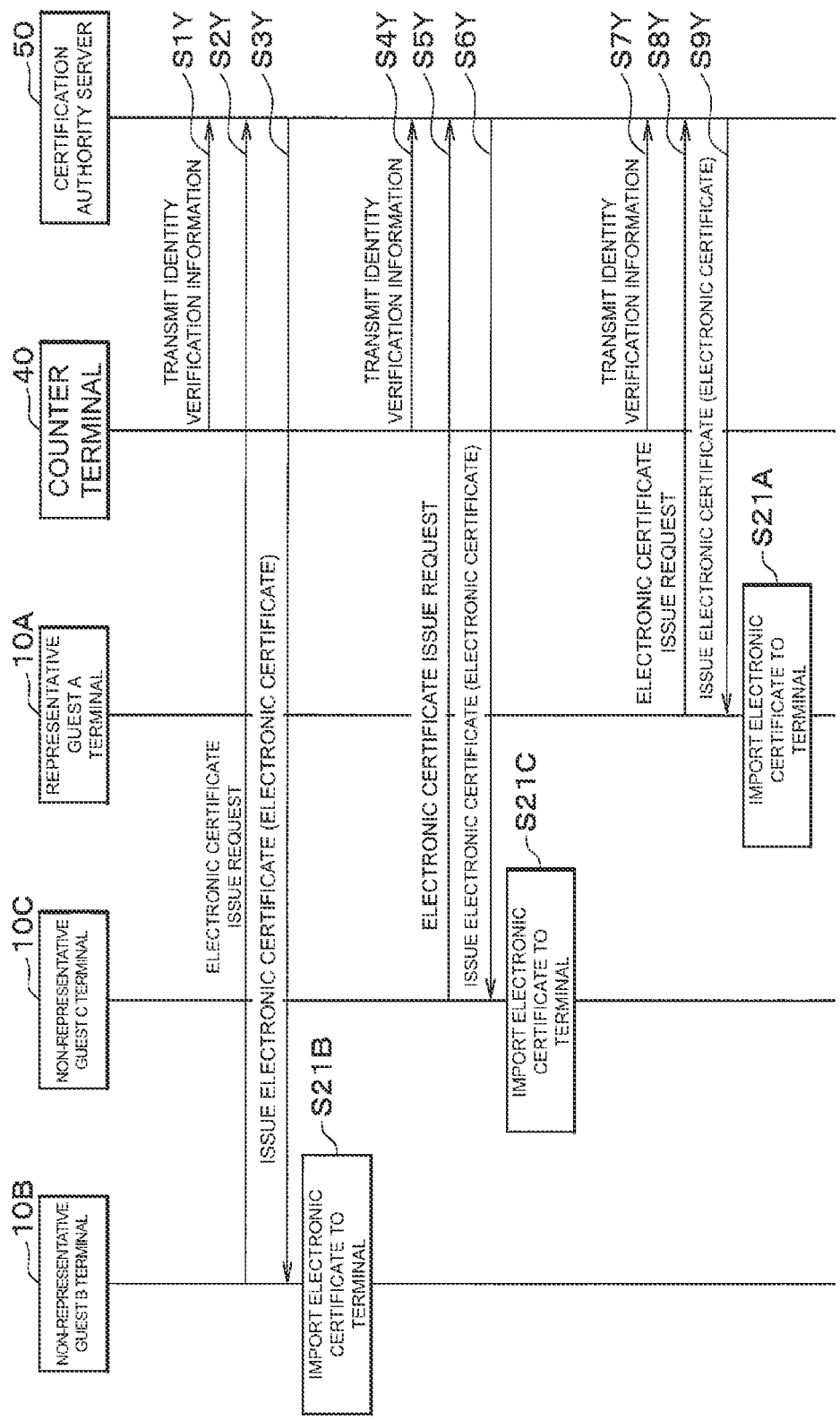
FIG. 9 is a sequence diagram illustrating an example operation for guest invitation in the authorization system according to the second embodiment of the present invention.

As illustrated in FIG. 9, this present example operation includes an operation of importing the electronic certificate to the terminals 10A, 10B, and 10C. First of all, the non-representative guest B visits the store and submits his or her identity verification document to a store staff. Then, the store staff operates counter terminal 40 so that the counter terminal 40 transmits identity verification information about the non-representative guest B based on the operation result to the certification authority server 50 (step S1Y). Then, in response to an operation of the non-representative guest B on the input unit 11 of the terminal 10B, the control unit 14 of the terminal 10B transmits an electronic certificate issue request to the certification authority server 50 via the communication unit 13 (step S2Y). Then, the certification authority server 50 issues an electronic certificate including the information about the non-representative guest B as the identity verification information to the terminal 10B based on the received identity verification information and the electronic certificate issue request (step S3Y). Then, the control unit 14 of the terminal 10B receives the electronic certificate via the communication unit 13 and imports it into the terminal 10B (step S21B). Note that the terminal 10B may be configured to generate the public key KpB and the private key KsB beforehand, so that the public key KpB thus generated can be enclosed in the electronic certificate issue request. In this case, the certification authority server 50 issues and transmits the electronic certificate including the public key KpB to the terminal 10B.

Similarly, the non-representative guest C visits the store and submits his or her identity verification document to a store staff. Then, the store staff operates the counter terminal 40 so that the counter terminal 40 transmits identity verification information about the non-representative guest C based on the operation result to the certification authority server 50 (step S4Y). Then, in response to an operation of the non-representative guest C on the input unit 11 of the terminal 10C, the control unit 14 of the terminal 10C transmits an electronic certificate issue request to the certification authority server 50 via the communication unit 13 (step S5Y). Then, the certification authority server 50 issues an electronic certificate including the information about the non-representative guest C as the identity verification information to the terminal 10C based on the received identity verification information and the electronic certificate issue request (step S6Y). Then, the control unit 14 of the terminal 10C receives the electronic certificate via the communication unit 13 and imports it into the terminal 10C (step S21C). Note that the terminal 10C may be configured to generate the public key KpC and the private key KsC beforehand, so that the public key KpC thus generated can be enclosed in the electronic certificate issue request. In this case, the certification authority server 50 issues and transmits the electronic certificate including the public key KpC to the terminal 10C.

Similarly, the representative guest A visits the store and submits his or her identity verification document to a store staff. Then, the store staff operates the counter terminal 40 so that the counter terminal 40 transmits identity verification information about the representative guest A based on the operation result to the certification authority server 50 (step S7Y). Then, in response to an operation of the representative guest A on the input unit 11 of the terminal 10A, the control unit 14 of the terminal 10A transmits an electronic certificate issue request to the certification authority server 50 via the communication unit 13 (step S9Y). Then, the certification authority server 50 issues an electronic certificate including the information about the representative guest A as the identity verification information to the terminal 10A based on the received identity verification information and the electronic certificate issue request (step S9Y). Then, the control unit 14 of the terminal 10A receives the electronic certificate via the communication unit 13 and imports it into the terminal 10A (step S21A). Note that the terminal 10A may be configured to generate the public key KpA and the private key KsA beforehand, so that the public key KpA thus generated can be enclosed in the electronic certificate issue request. In this case, the certification authority server 50 issues and transmits the electronic certificate including the public key KpA to the terminal 10A.

Figure 10:
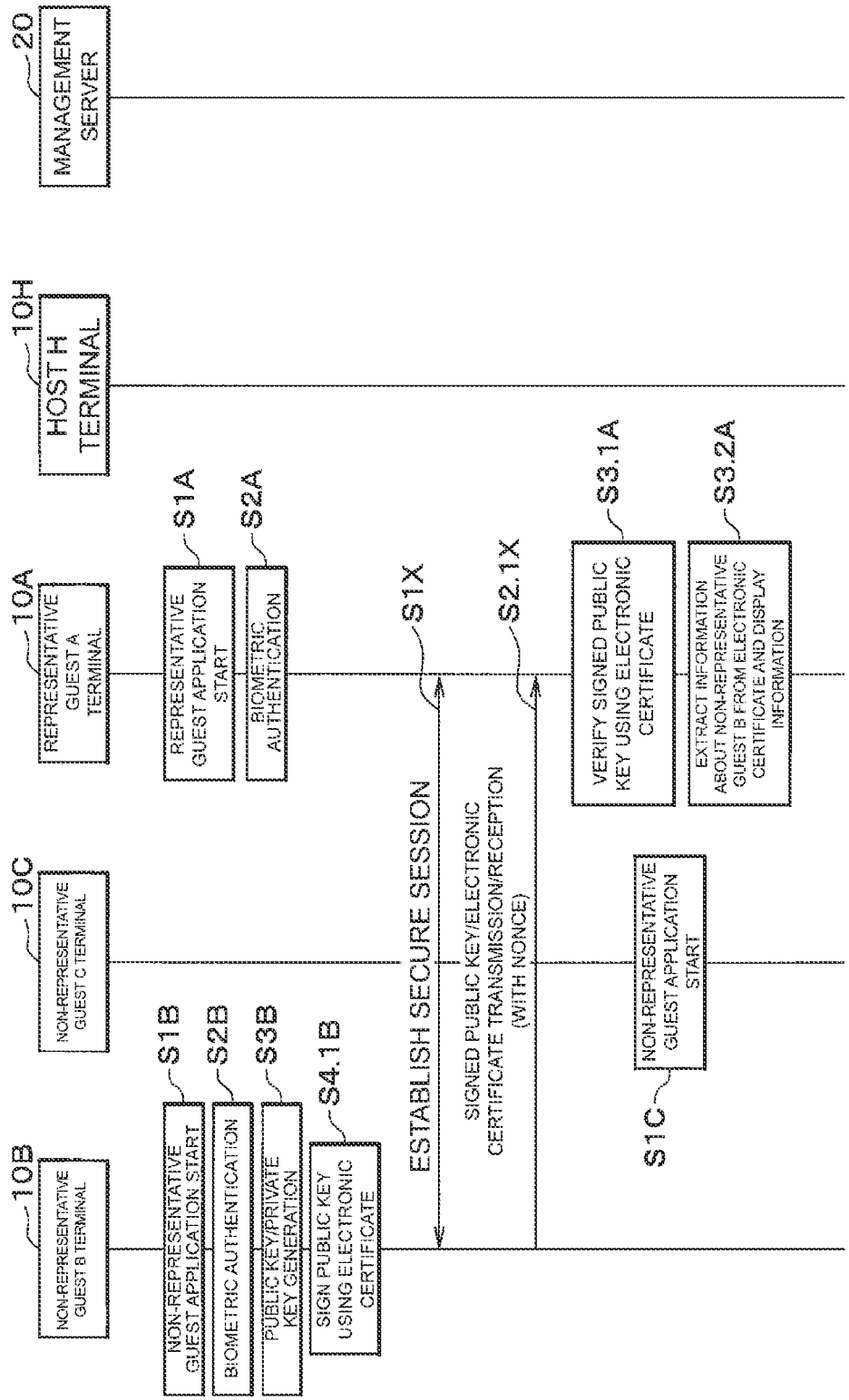
FIG. 10 is a sequence diagram illustrating an example operation for guest invitation in the authorization system according to the second embodiment of the present invention.

As illustrated in FIG. 10, the control unit 14 of the terminal 10B then executes steps S4.1B instead of step S4B. Specifically, the control unit 14 of the terminal 10B signs the public key KpB using the electronic certificate of the non-representative guest B, and generates a signed public key Sig (KpB) (step S4.1B). The electronic certificate of the non-representative guest B from the control unit 14 encloses the public key KpB before the signing. The public key KpB included in the electronic certificate is used for verification in the later stage.

The control units 14 of the terminal 10B and the terminal 10A execute step S2.1X instead of step S2X. Specifically, the control unit 14 of the terminal 10B transmits, via the communication unit 13, the signed public key Sig (KpB) and the electronic certificate of the non-representative guest B. The control unit 14 of the terminal 10A receives, via the communication unit 13, the signed public key Sig (KpB) and the electronic certificate of the non-representative guest B (step S2.1X).

The control unit 14 of the terminal 10A executes steps S3.1A and S3.2A instead of step S3. Specifically, the control unit 14 of the terminal 10A verifies the signed public key Sig (KpB) using the electronic certificate of the non-representative guest B (step S3.1A). Then, the control unit 14 of the terminal 10A extracts the information about the non-representative guest B from the electronic certificate, and makes the output unit 12 display the extracted information (step S3.2A).

Figure 11:
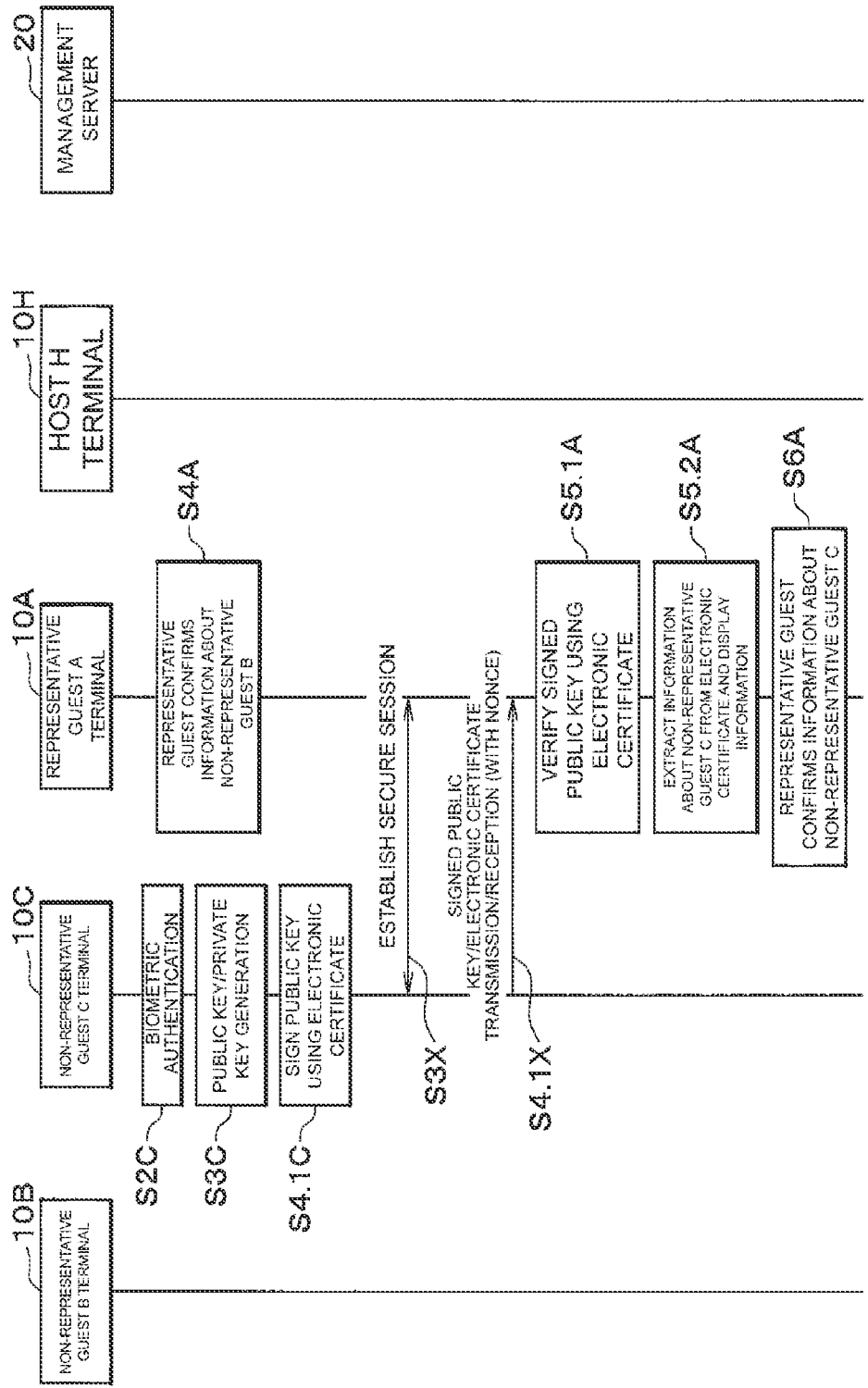
FIG. 11 is a sequence diagram illustrating an example operation for guest invitation in the authorization system according to the second embodiment of the present invention.

Similarly, as illustrated in FIG. 11, the control unit 14 of the terminal 10C executes steps S4.1C instead of step S4C. Specifically, the control unit 14 of the terminal 10C signs the public key KpC using the electronic certificate of the non-representative guest C, and generates a signed public key Sig (KpC) (step S4.1C). The electronic certificate of the non-representative guest C from the control unit 14 encloses the public key KpC before the signing. The public key KpC included in the electronic certificate is used for verification in the later stage.

The control units 14 of the terminal 10C and the terminal 10A execute step S4.1X instead of step S4X. Specifically, the control unit 14 of the terminal 10C transmits, via the communication unit 13, the signed public key Sig (KpC) and the electronic certificate of the non-representative guest C. The control unit 14 of the terminal 10A receives, via the communication unit 13, the signed public key Sig (KpC) and the electronic certificate of the non-representative guest C (step S4.1X).

The control unit 14 of the terminal 10A executes steps S5.1A and S5.2A instead of step S5. Specifically, the control unit 14 of the terminal 10A verifies the signed public key Sig (KpC) using the electronic certificate of the non-representative guest C (step S5.1A). Then, the control unit 14 of the terminal 10A extracts the information about the non-representative guest C from the electronic certificate, and makes the output unit 12 display the extracted information (step S5.2A).

Figure 12:
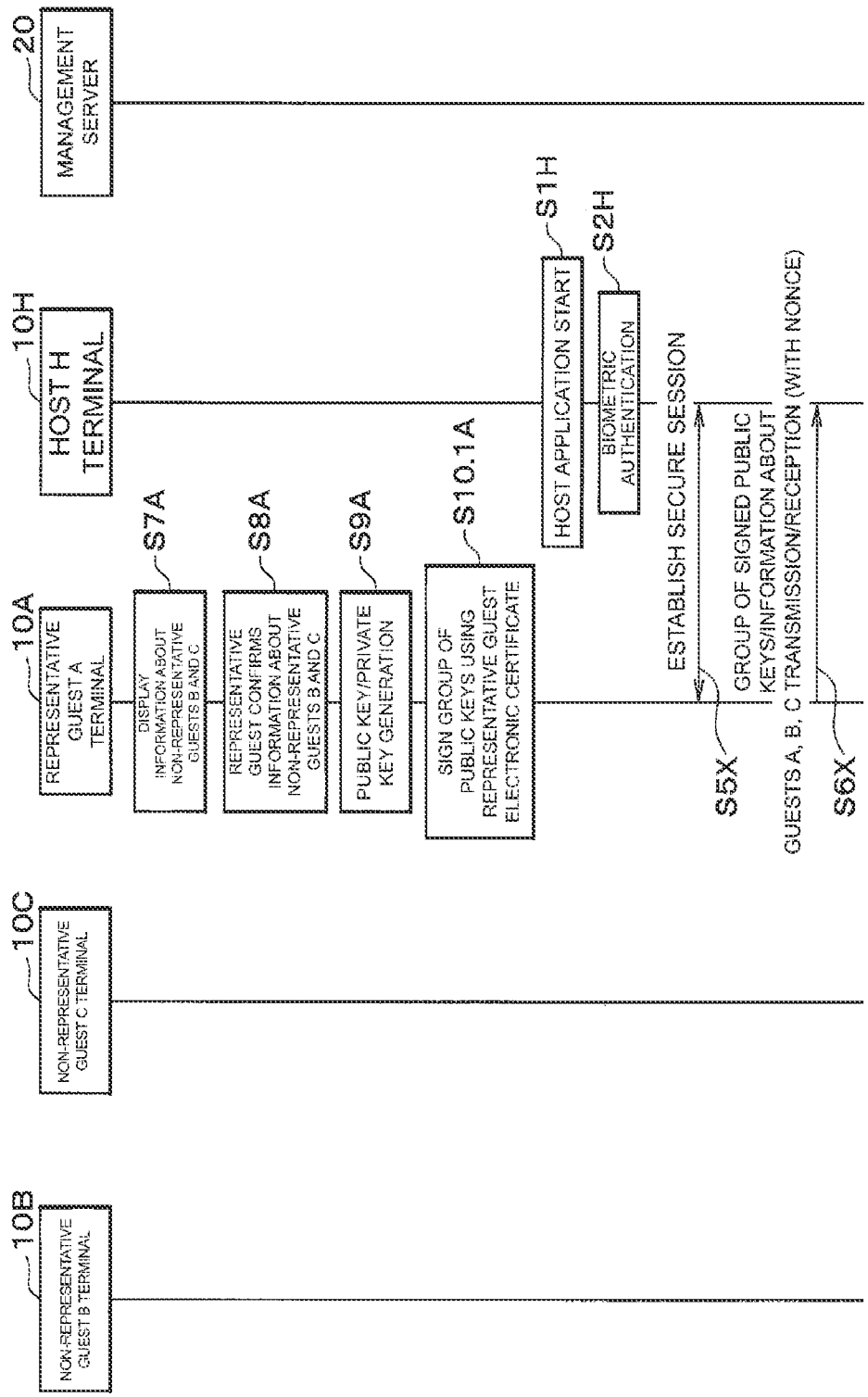
FIG. 12 is a sequence diagram illustrating an example operation for guest invitation in the authorization system according to the second embodiment of the present invention.

As illustrated in FIG. 12, the control unit 14 of the terminal 10A executes step S10.1A instead of step S10A. Specifically, the control unit 14 of the terminal 10A signs a group of public keys KpA, Sig (KpB), and Sig (KpC) using the electronic certificate of the representative guest A, to generate a group of signed public keys Sig (KpA), Sig (KpB), and Sig (KpC) (step S10.1A). The control unit 14 makes the public key KpA included in the electronic certificate of the representative guest A, before the signing. The public key KpA enclosed in the electronic certificate is used for verification in the later stage.

Figure 13:
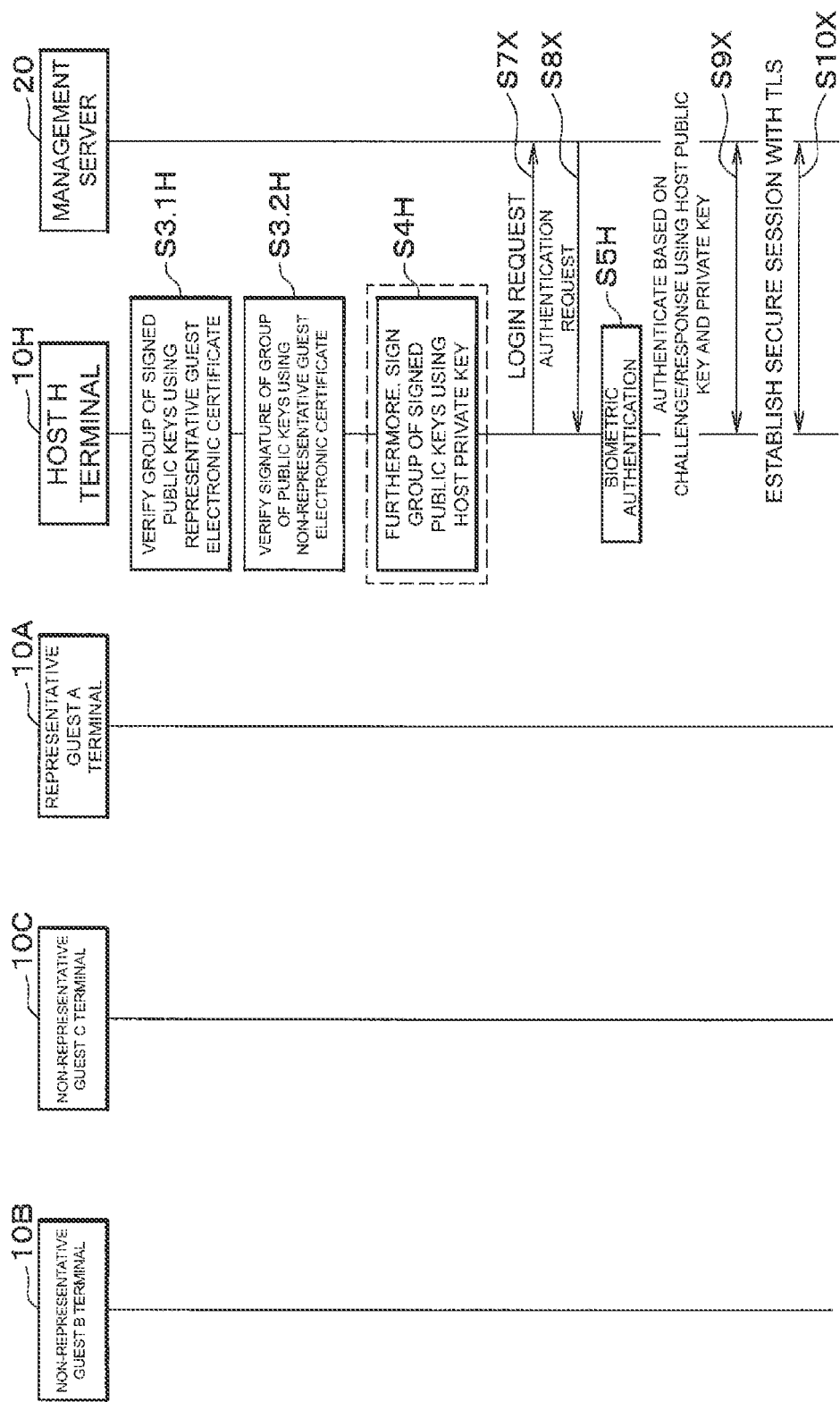
FIG. 13 is a sequence diagram illustrating an example operation for guest invitation in the authorization system according to the second embodiment of the present invention.

As illustrated in FIG. 13, the control unit 14 of the terminal 10H executes steps S3.1H and S3.2H instead of step S3H. Specifically, the control unit 14 of the terminal 10H verifies a group of signed public keys Sig (KpA, Sig (KpB), and Sig (KpC)) using the electronic certificate of the representative guest A (step S3.1H). Then, the control unit 14 of the terminal 10H verifies the signed public key Sig (KpB) using the electronic certificate of the non-representative guest B, and verifies the signed public key Sig (KpC) using the electronic certificate of the non-representative guest C (step S3.2H). Here, each verification is assumed to have resulted in the information about each guest proven to be authentic.

Figure 14:
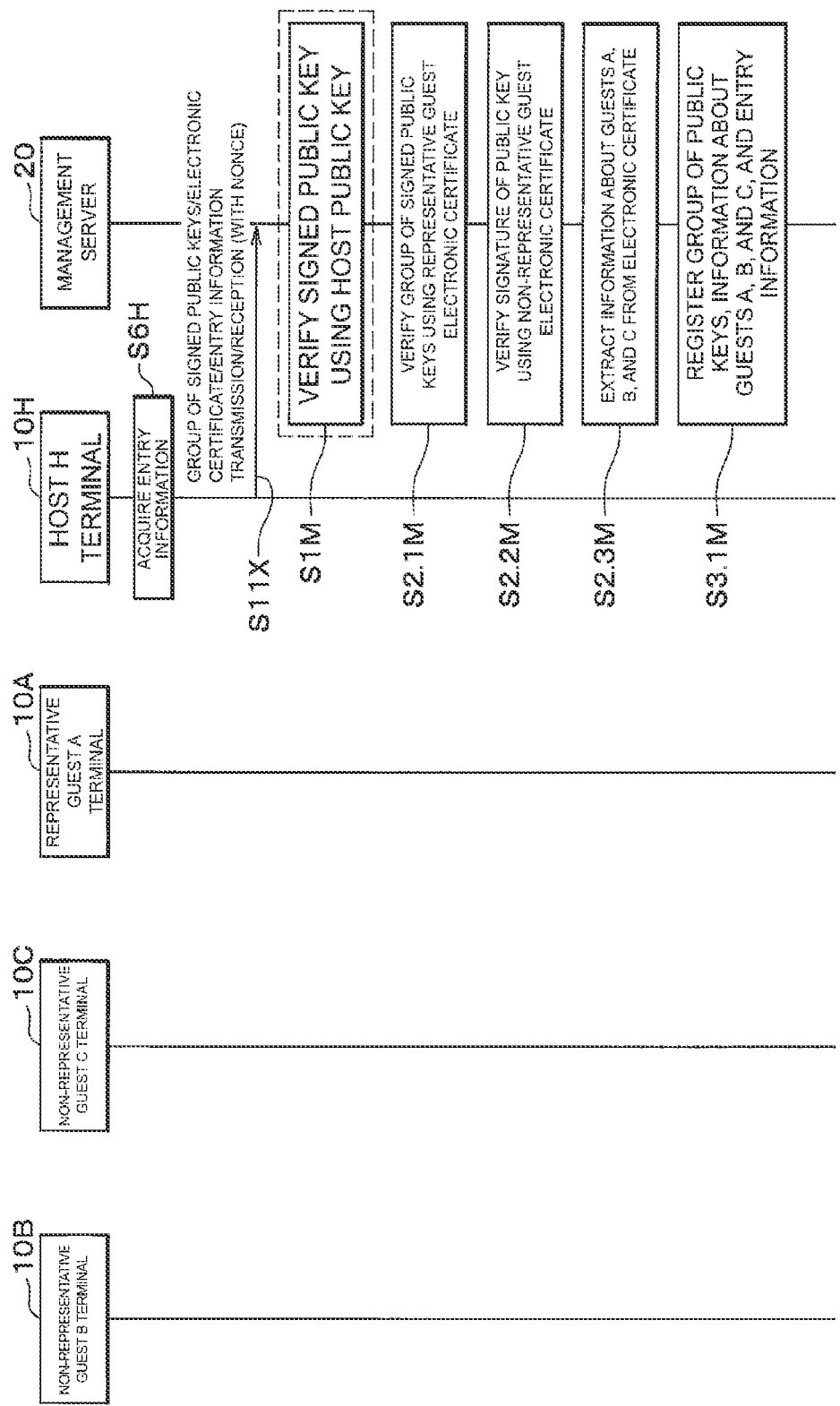
FIG. 14 is a sequence diagram illustrating an example operation for guest invitation in the authorization system according to the second embodiment of the present invention.

Furthermore, in the present example operation, step S4H is executed in a case where the host H needs to verify the identification of each of the guests A, B, and C, and thus may be omitted. As illustrated in FIG. 14, step S1M can be omitted when step S4H is omitted.

The management server 20 executes steps S2.1M, S2.2M, S2.3M, and S3.1M instead of steps S2M and 3M. Specifically, the management server 20 verifies a group of signed public keys Sig (KpA, Sig (KpB), and Sig (KpC)) using the electronic certificate of the representative guest A (step S2.1M). Then, the management server 20 verifies the signed public key Sig (KpB) using the electronic certificate of the non-representative guest B, and verifies the signed public key Sig (KpC) using the electronic certificate of the non-representative guest C (step S2.2M). Here, each verification is assumed to have resulted in the information about each guest proven to be authentic. Next, the management server 20 extracts information about the guests A, B, and C from the electronic certificates of the guests A, B, and C (steps S2.3M). Then, the management server 20 registers the group of public keys KpA, KpB, and KpC, the electronic certificates of the guests A, B, and C, the information about the guests A, B, and C, and the entry information (step S3.1M). More specifically, the management server 20 performs authentication based on the public key KpH of the host H included in the public key group acquired, as well as the public key KpH of the host H registered in advance in the management server 20, when each verification proves their authenticity. Then, when the authentication is successful (the public keys KpH match), the management server 20 stores the information about the guests A, B, and C, the public keys of the terminals 10A, 10B, and 10C, and the entry information in a storage unit (such as a database) of the management server 20.

The following operations are the identical as those in the first example operation, and thus the description thereof will be omitted.

As described above, in the authorization system 1Y, the non-representative guest terminals 10B and 10C have the electronic certificates including the information about the non-representative guests B and C, and the representative guest terminal 10A has the electronic certificate including the information about the representative guest A.

The non-representative guest terminals 10B and 10C signs the information about the non-representative guest terminals 10B and 10C using the electronic certificates of the non-representative guests B and C.

The representative guest terminal 10A acquires the signed information about the non-representative guest terminals 10B and 10C and the electronic certificates of the non-representative guests B and C from the non-representative guest terminals 10B and 10C, and verifies the signed information about the non-representative guest terminals 10B and 10C using the electronic certificates of the non-representative guests B and C. Then, the representative guest terminal 10A signs the information about the representative guest terminal 10A and the signed information about the non-representative guest terminals 10B and 10C that has been proven to be authentic through the verification, using the electronic certificate of the representative guest A.

The host terminal 10H acquires from the representative guest terminal 10A, the signed information about the representative guest terminal 10A and about the non-representative guest terminals 10B and 10C, as well as the electronic certificate of the representative guest A and the electronic certificates of the non-representative guests B and C. Then, the host terminal 10H verifies the signed information about the representative guest terminal 10A and about the non-representative guest terminals 10B and 10C, using the electronic certificates of the representative guest 10A and the non-representative guests 10B and 10C.

The management server 20 acquires, from the host terminal 10H, the signed information about the representative guest terminal 10A and about the non-representative guest terminals 10B and 10C that has been verified by the host terminal 10H as well as the electronic certificates of the representative guest A and the non-representative guests B and C. Then, the management server 20 verifies the signed information about the representative guest terminal 10A and about the non-representative guest terminals 10B and 10C, using the electronic certificates of the representative guest A and the non-representative guests B and C. Then, the management server 20 registers the information about the representative guest terminal 10A and the information about the non-representative guest terminals 10B and 10C that have been proven to be authentic by the verification. The management server 20 acquires the terminal information from the smart lock 30, performs authentication based on the information about the registered representative guest terminal 10A and about the non-representative guest terminals 10B and 10C and of the terminal information acquired from the smart lock 30, and unlocks the smart lock 30 depending on the authentication result.

The authorization system 1Y further includes an information acquisition device 40 and a certification authority server 50.

The information acquisition device 40 acquires the information about the non-representative guests B and C and the information about the representative guest A, and transmits the information to the certification authority server 50.

The certification authority server 50 generates the electronic certificates of the non-representative guests B and C based on the information about the non-representative guests B and C to transmit the electronic certificates to the non-representative guest terminals 10B and 10C, and also generates the electronic certificate of the representative guest A based on the information about the representative guest A to transmit the electronic certificate to the representative guest terminal 10A.

The authorization system 1Y according to the second embodiment of the present invention stores an electronic certificate and signs a public key using the electronic certificate issued by the certification authority server 50. This electronic certificate includes information corresponding to a business card, and is generated by a trusted organization (such as a communication carrier that performs identity verification for example). Thus, the authorization system 1Y can more effectively verify the identities of the guests A, B, and C, with the terminal 10H of the host H verifying the electronic certificates of the guests.

Third Embodiment

Figure 15:
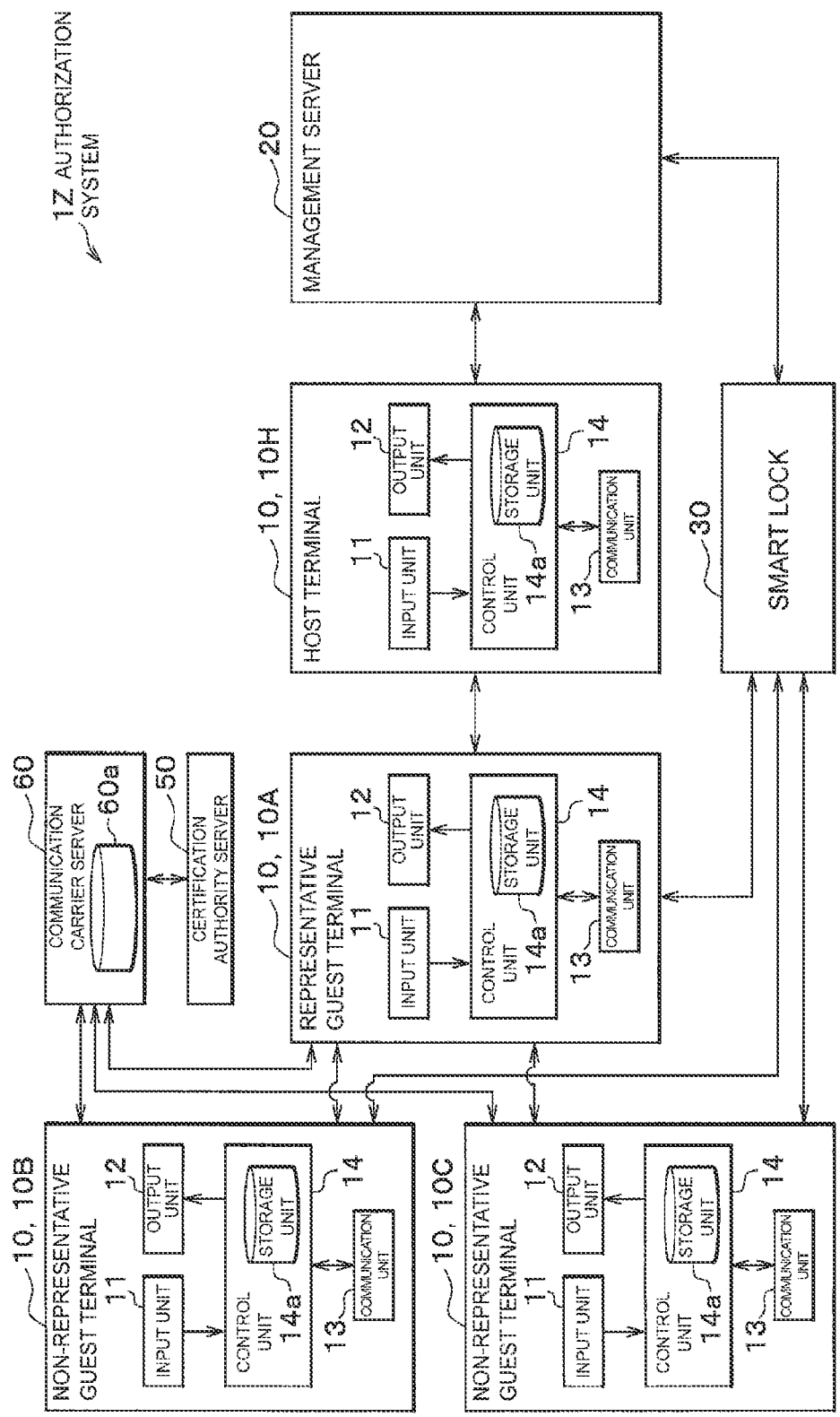
FIG. 15 is a diagram schematically illustrating an authorization system according to a third embodiment of the present invention.

Next, an authorization system according to a third embodiment of the present invention will be described while focusing on differences from the authorization system 1Y according to the second embodiment. As illustrated in FIG. 15, an authorization system 1Z according to the third embodiment of the present invention includes a communication carrier server 60 instead of the counter terminal 40.

Communication Carrier Server

The communication carrier server 60 transmits, to the certification authority server 50, the information about the guests A, B, and C stored in advance, based on a request from the terminals 10A, 10B, 10C of the guests A and B.

Certification Authority Server

The certification authority server 50 receives the information about the guests A, B, and C transmitted from the communication carrier server 60, generates an electronic certificate for the guests A, B, and C based on the received information about the guests A, B, and C, and transmits the generated electronic certificate to the terminals 10A, 10B, and 10C of the guests A, B, and C via the communication carrier server 60 for example.

EXAMPLE OPERATION

Next, an example operation of the authorization system 1Z according to the third embodiment of the present invention will be described while focusing on differences from the operation example of the authorization system 1Y according to the second embodiment.

Figure 16:
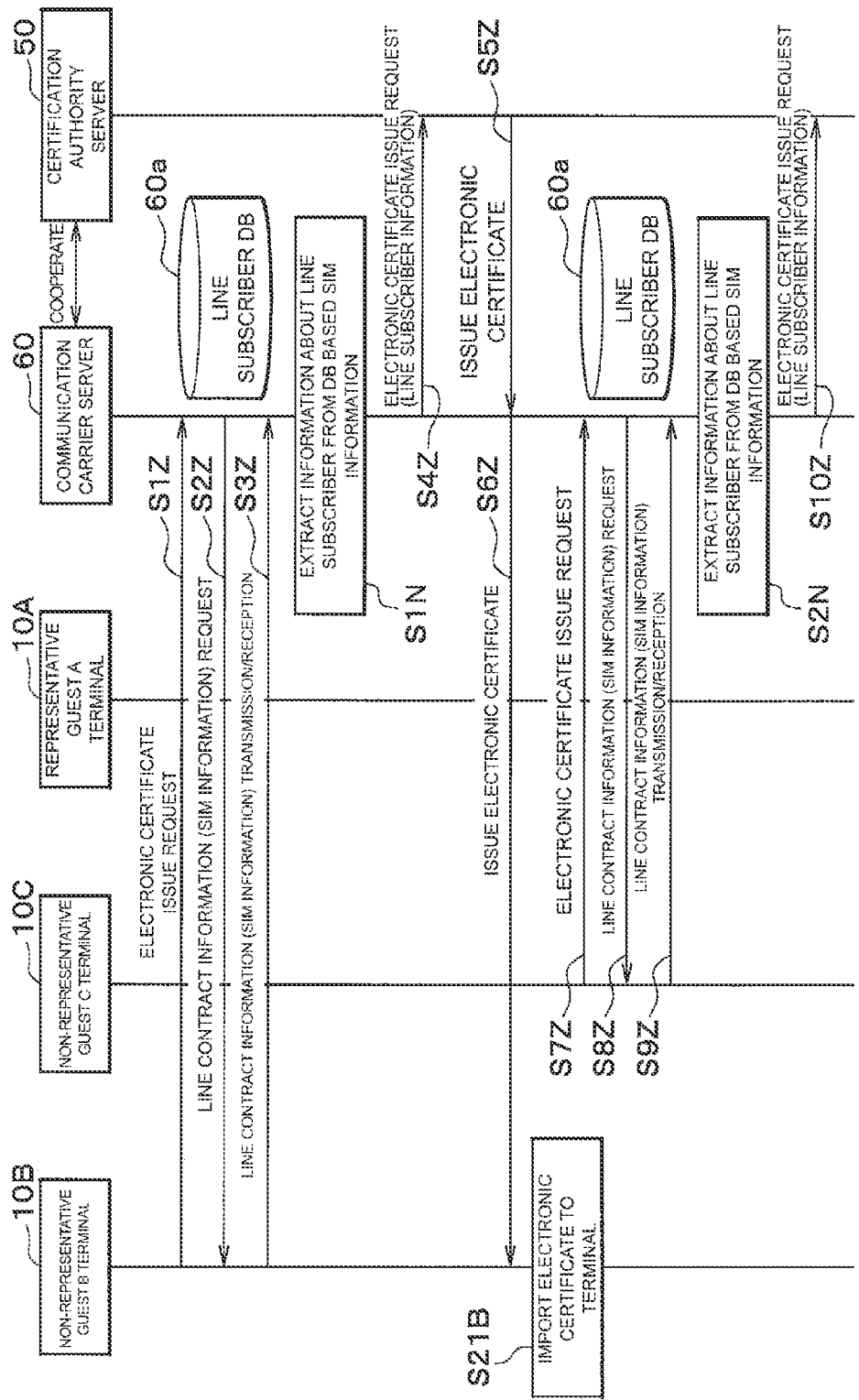
FIG. 16 is a sequence diagram illustrating an example operation for guest invitation in the authorization system according to the third embodiment of the present invention.

As illustrated in FIG. 16, in the present example operation, steps S1Z to 3Z, step S1N, and steps S4Z to S6Z are executed instead of steps S1Y to S3Y. Specifically, in response to an operation of the non-representative guest B on the input unit 11 of the terminal 10B, the control unit 14 of the terminal 10B transmits an electronic certificate issue request to the communication carrier server 60 via the communication unit 13 (step S1Z). Here, the electronic certificate issue request includes the public key KpB, unique to the terminal 10B, generated by the control unit 14. In other words, the control unit 14 of the terminal 10B generates the public key KpB and the private key KsB at this point. Then, upon receiving the electronic certificate issue request, the communication carrier server 60 transmits a line contract information request to the control unit 14 of the terminal 10B (step S2Z). Thus, upon receiving the line contract information request via the communication unit 13, the control unit 14 of the terminal 10B transmits line contract information to the communication carrier server 60 via the communication unit 13 (step S3Z).

Then, upon receiving the line contract information, the communication carrier server 60 acquires information about a line subscriber (that is, the non-representative guest B) by referring to a line subscriber database 60a by using the received line contract information (step S1N).

Then, the communication carrier server 60 transmits an electronic certificate issue request including the acquired information about the line subscriber to the certification authority server 50 (step S4Z). Here, the communication carrier server 60 transmits user information (such as SIM information) held in the line subscriber database 60a as the line subscriber information, based on a reliability level of the identity verification executed by the carrier when the non-representative guest B makes a contract for the subscription.

Then, upon receiving the electronic certificate issue request, the certification authority server 50 issues and transmits the electronic certificate including the information about the non-representative guest B to the communication carrier server 60 (step S5Z). Then, the communication carrier server 60 transfers the electronic certificate of the non-representative guest B to the control unit 14 of the terminal 10B (step S6Z). Here, the electronic certificate includes the public key KpB of the terminal 10B. The public key KpB included in the electronic certificate is used for verification in the later stage.

Figure 17:
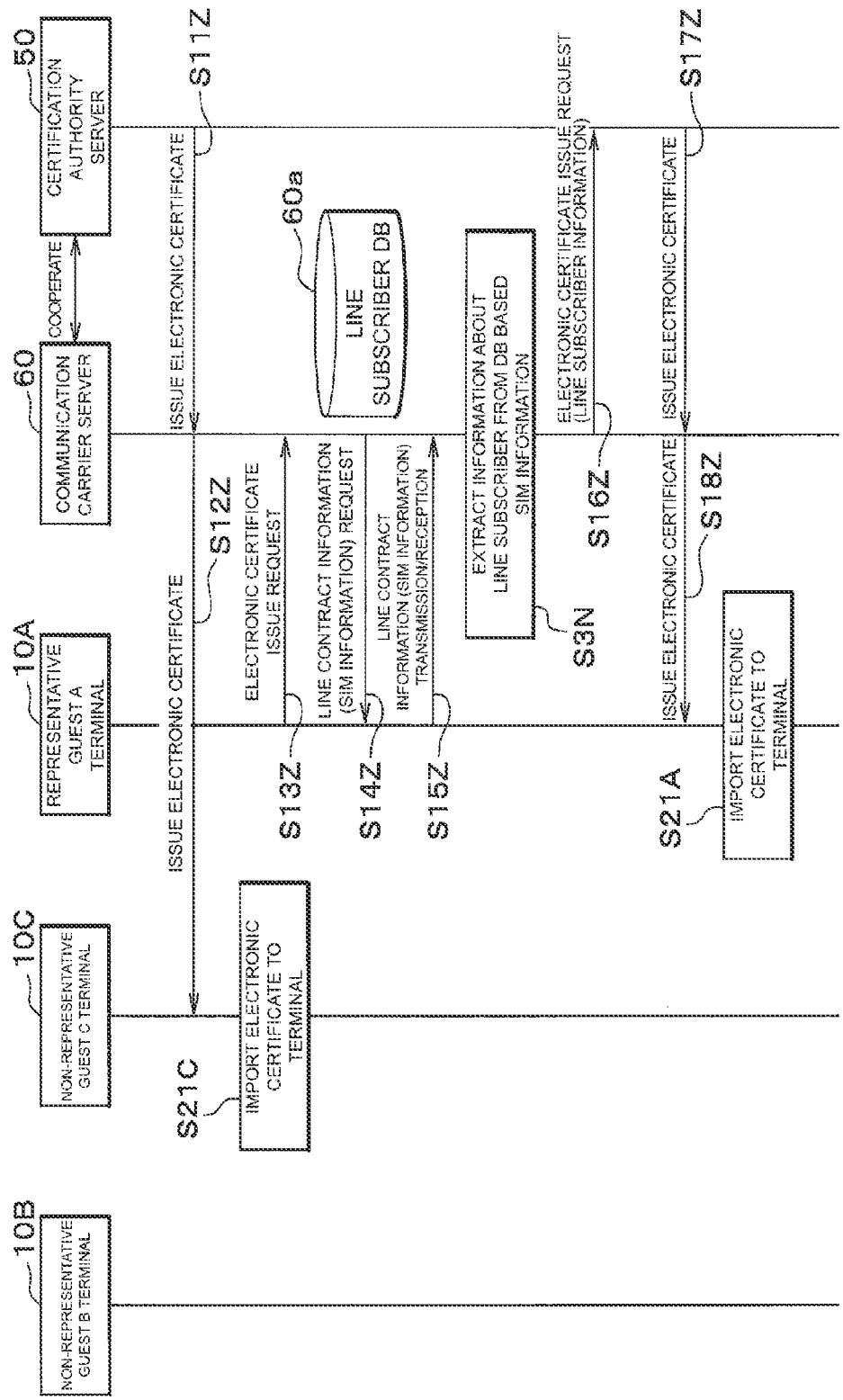
FIG. 17 is a sequence diagram illustrating an example operation for guest invitation in the authorization system according to the third embodiment of the present invention.

Similarly, as illustrated in FIGS. 16 and 17, in the present example operation, steps S7Z to 9Z, step S2N, and steps S10Z to S12Z are executed instead of steps S4Y to S6Y. Specifically, in response to an operation of the non-representative guest C on the input unit 11 of the terminal 10C, the control unit 14 of the terminal 10C transmits an electronic certificate issue request to the communication carrier server 60 via the communication unit 13 (step S7Z). Here, the electronic certificate issue request includes the public key KpC, unique to the terminal 10C, generated by the control unit 14. In other words, the control unit 14 of the terminal 10C generates the public key KpC and the private key KsC at this point. Then, upon receiving the electronic certificate issue request, the communication carrier server 60 transmits a line contract information request to the control unit 14 of the terminal 10C (step S8Z). Thus, upon receiving the line contract information request via the communication unit 13, the control unit 14 of the terminal 10C transmits line contract information to the communication carrier server 60 via the communication unit 13 (step S9Z).

Then, upon receiving the line contract information, the communication carrier server 60 acquires information about a line subscriber (that is, the non-representative guest C) by referring to a line subscriber database 60a by using the received line contract information (step S2N).

Then, the communication carrier server 60 transmits an electronic certificate issue request including the acquired information about the line subscriber to the certification authority server 50 (step S10Z). Here, the communication carrier server 60 transmits user information (such as SIM information) held in the line subscriber database 60a as the line subscriber information, based on a reliability level of the identity verification executed by the carrier when the non-representative guest C makes a contract for the subscription.

Then, as illustrated in FIG. 17, upon receiving the electronic certificate issue request, the certification authority server 50 issues and transmits the electronic certificate of the non-representative guest C to the communication carrier server 60 (step S11Z). Then, the communication carrier server 60 transfers the electronic certificate including the information about the non-representative guest C to the control unit 14 of the terminal 10C (step S12Z). Here, the electronic certificate includes the public key KpC of the terminal 10C. The public key KpC included in the electronic certificate is used for verification in the later stage.

Similarly, in the present example operation, steps S13Z to 15Z, step S3N, and steps S16Z to S18Z are executed instead of steps S7Y to S9Y. In other words, when the representative guest A operates the input unit 11 of the terminal 10A, the control unit 14 of the terminal 10C transmits the electronic certificate issue request to the communication carrier server 60 via the communication unit 13 (step S13Z). Here, the electronic certificate issue request includes the public key KpA, unique to the terminal 10A, generated by the control unit 14. In other words, the control unit 14 of the terminal 10A generates the public key KpA and the private key KsA at this point. Then, upon receiving the electronic certificate issue request, the communication carrier server 60 transmits a line contract information request to the control unit 14 of the terminal 10A (step S14Z). Thus, upon receiving the line contract information request via the communication unit 13, the control unit 14 of the terminal 10A transmits line contract information to the communication carrier server 60 via the communication unit 13 (step S15Z).

Then, upon receiving the line contract information, the communication carrier server 60 acquires information about a line subscriber (that is, the representative guest A) by referring to a line subscriber database 60a by using the received line contract information (step S3N).

Then, the communication carrier server 60 transmits an electronic certificate issue request including the acquired information about the line subscriber to the certification authority server 50 (step S16Z). Here, the communication carrier server 60 transmits user information (such as SIM information) held in the line subscriber database 60a as the line subscriber information, based on a reliability level of the identity verification executed by the carrier when the representative guest A makes a contract for the subscription.

Then, upon receiving the electronic certificate issue request, the certification authority server 50 issues and transmits the electronic certificate of the representative guest B to the communication carrier server 60 (step S17Z). Then, the communication carrier server 60 transfers the electronic certificate including the information about the representative guest B to the control unit 14 of the terminal 10A (step S18Z). Here, the electronic certificate includes the public key KpA of the terminal 10A. The public key KpC included in the electronic certificate is used for verification in the later stage.

The following operations are the identical as those in the second example operation, and thus the description thereof will be omitted.

As described above, the authorization system 1Z includes the communication carrier server 60 and the certification authority server 50.

The communication carrier server 60 transmits the information about the non-representative guests B and C and the information about the representative guest terminal A stored in advance to the certification authority server 50, based on a request from the non-representative guest terminals 10B and 10C and the representative guest terminal 10A.

The certification authority server 50 generates the electronic certificates of the non-representative guests B and C based on the information about the non-representative guests B and C to transmit the electronic certificates to the non-representative guest terminals 10B and 10C, and also generates the electronic certificate of the representative guest A based on the information about the representative guest A to transmit the electronic certificate to the representative guest terminal 10A.

In the authorization system 1Z according to the third embodiment of the present invention, the electronic certificate is issued by using the information about the line subscriber stored in the communication carrier server 60, the guests A, B, and C need not to go through cumbersome procedures of making an identity verification document and visiting the store, whereby a load for procedure required for acquiring the electronic certificates of the guests can be favorably reduced.

Hitherto, the embodiment of the present disclosure has been described. However, the present disclosure is not limited to the above embodiment, and can be appropriately changed in a range without departing from the gist of the present disclosure. For example, the present invention is applicable to temporary sharing of keys for private lodging services. In such a case, a tourist is the representative guest and a person accompanying him or her is the non-representative guest. The present invention is also applicable to the distribution of electronic tickets for a public performance. In such a case, a ticket purchaser is the representative guest and a person accompanying him or her is the non-representative guest. Furthermore, the present invention is applicable to a pre-reservation of a rental bicycle. In such a case, the user of the bicycle is the representative guest. The information about the terminals 10A, 10B, and 10C is not limited to the key information (public key or private key) described above, and may be information unique to each of the terminals 10A, 10B, and 10C (such as an IP address, for example).

REFERENCE SIGNS LIST 1X, 1Y, 1Z authorization system
10A Terminal (representative guest terminal)
10B, 10C Terminal (non-representative guest terminal)
10H Terminal (host terminal)
20 Management server
30 Smart lock
40 Counter terminal (information acquisition device)
50 Certification authority server
60 Communication carrier server

The invention claimed is:

1. An authorization system comprising:
a non-representative guest terminal;
a representative guest terminal;
a host terminal;
a management server; and
a smart lock, wherein
the representative guest terminal is configured to acquire information about the non-representative guest terminal from the non-representative guest terminal, and when a representative guest confirms information about a non-representative guest, sign information about the representative guest terminal and the information about the non-representative guest terminal acquired,
the host terminal is configured to acquire information about the representative guest and the information about the representative guest terminal and the information about the non-representative guest terminal that are signed from the representative guest terminal, verify the information about the representative guest terminal and the information about the non-representative guest terminal that are signed when a host confirms the information about the representative guest, and sign the information about the representative guest terminal and the information about the non-representative guest terminal that are proven to be authentic by the verification,
the management server is configured to acquire from the host terminal, information about the host terminal and the information about the representative guest terminal and the information about the non-representative guest terminal that are signed, verify the information about the representative guest terminal and the information about the non-representative guest terminal that are signed, perform authentication based on the information about the host terminal acquired and information about the host terminal registered in advance when the information is proven to be authentic by the verification, and register the information about the representative guest terminal and the information about the non-representative guest terminal when the authentication is successful, and
the management server is configured to acquire information about a terminal from the smart lock, perform authentication based on the information about the representative guest terminal and the non-representative guest terminal registered and the information about the terminal acquired from the smart lock, and unlock the smart lock depending on a result of the authentication.

2. An authorization system comprising:
a non-representative guest terminal;
a representative guest terminal;
a host terminal;
a management server; and
a smart lock, wherein
the non-representative guest terminal has an electronic certificate including information about a non-representative guest,
the representative guest terminal has an electronic certificate including information about a representative guest,
the non-representative guest terminal is configured to sign information about the non-representative guest terminal using the electronic certificate of the non-representative guest,
the representative guest terminal is configured to acquire information about the non-representative guest terminal that is signed and the electronic certificate of the non-representative guest from the non-representative guest terminal, verify the information about the non-representative guest terminal that is signed, by using the electronic certificate of the non-representative guest, and sign information about the representative guest terminal and the information about the non-representative guest terminal that is signed and proven to be authentic by the verification by using the electronic certificate of the representative guest,
the host terminal is configured to acquire from the representative guest terminal, the information about the representative guest terminal and the information about the non-representative guest terminal that are signed, as well as the electronic certificate of the representative guest and the electronic certificate of the non-representative guest, and verify the information about the representative guest terminal and the information about the non-representative guest terminal that are signed, by using the electronic certificate of the representative guest and the electronic certificate of the non-representative guest, the management server is configured to acquire from the host terminal, the information about the representative guest terminal and the information about the non-representative guest terminal that are signed and are verified by the host terminal as well as the electronic certificate of the representative guest and the electronic certificate of the non-representative guest, verify the information about the representative guest terminal and the information about the non-representative guest terminal that are signed, by using the electronic certificate of the representative guest and the electronic certificate of the non-representative guest, and register the information about the representative guest terminal and the information about the non-representative guest terminal proven to be authentic by the verification, and the management server is configured to information about a terminal from the smart lock, perform authentication based on the information about the representative guest terminal and the non-representative guest terminal registered and the information about the terminal acquired from the smart lock, and unlock the smart lock depending on a result of the authentication.

3. The authorization system according to claim 2 further comprising:

an information acquisition device; and a certification authority server, wherein the information acquisition device is configured to acquire the information about the non-representative guest and the information about the representative guest, and transmit the information to the certification authority server, and the certification authority server is configured to generate the electronic certificate of the non-representative guest based on the information about the non-representative guest to transmit the electronic certificate to the non-representative guest terminal, and generate the electronic certificate of the representative guest based on the information about the representative guest to transmit the electronic certificate to the representative guest terminal.

4. The authorization system according to claim 2 further comprising:

a communication carrier server; and a certification authority server, wherein the communication carrier server is configured to transmit information about the non-representative guest and information about the representative guest terminal stored in advance to the certification authority server based on a request from the non-representative guest terminal and the representative guest terminal, and the certification authority server is configured to generate the electronic certificate of the non-representative guest based on the information about the non-representative guest transmit the electronic certificate to the non-representative guest terminal, and generate the electronic certificate of the representative guest based on the information about the representative guest transmit the electronic certificate to the representative guest terminal.

5. An authorization method performed by an authorization system including a non-representative guest terminal, a representative guest terminal, a host terminal, a management server, and a smart lock, the authorization method comprising:

at the representative guest terminal, acquiring information about the non-representative guest terminal from the non-representative guest terminal, and when a representative guest confirms information about a non-representative guest, signing information about the representative guest terminal and the information about the non-representative guest terminal acquired to transmit the information to the host terminal;

at the host terminal, acquiring information about the representative guest and the information about the representative guest terminal and the information about the non-representative guest terminal that are signed from the representative guest terminal, verifying the information about the representative guest terminal and the information about the non-representative guest terminal that are signed when a host confirms the information about the representative guest, and signing the information about the representative guest terminal and the information about the non-representative guest terminal that are proven to be authentic by the verification to transmit the information together with information about the host terminal to the management server;

at the management server, acquiring from the host terminal, information about the host terminal and the information about the representative guest terminal and the information about the non-representative guest terminal that are signed, verifying the information about the representative guest terminal and the information about the non-representative guest terminal that are signed, performing authentication based on the information about the host terminal acquired and information about the host terminal registered in advance when the information is proven to be authentic by the verification, and registering the information about the representative guest terminal and the information about the non-representative guest terminal when the authentication is successful; and at the management server, acquiring information about a terminal from the smart lock, performing authentication based on the information about the representative guest terminal and the non-representative guest terminal registered and the information about the terminal acquired from the smart lock, and unlocking the smart lock depending on a result of the authentication.

* * * * *